United States Patent
Maturana et al.

(10) Patent No.: US 10,095,202 B2
(45) Date of Patent: Oct. 9, 2018

(54) MULTIPLE CONTROLLERS CONFIGURATION MANAGEMENT INTERFACE FOR SYSTEM CONNECTIVITY

(71) Applicant: Rockwell Automation Technologies, Inc., Mayfield Heights, OH (US)

(72) Inventors: Francisco P. Maturana, Lyndhurst, OH (US); Juan L. Asenjo, Timberlake, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 85 days.

(21) Appl. No.: 14/639,279

(22) Filed: Mar. 5, 2015

(65) Prior Publication Data

US 2015/0277406 A1    Oct. 1, 2015

Related U.S. Application Data

(60) Provisional application No. 61/970,798, filed on Mar. 26, 2014.

(51) Int. Cl.
*G05B 15/02* (2006.01)
*G06F 9/451* (2018.01)
*G05B 19/042* (2006.01)

(52) U.S. Cl.
CPC ......... *G05B 15/02* (2013.01); *G05B 19/0423* (2013.01); *G06F 9/451* (2018.02);
(Continued)

(58) Field of Classification Search
CPC ................ G05B 15/02; G05B 19/0423; G05B 2219/25083; G05B 2219/25057;
(Continued)

(56) References Cited

U.S. PATENT DOCUMENTS 5,519,605 A    5/1996  Cawlfield
6,230,010 B1 *  5/2001  Morris ............... H04B 7/18567
                                                    455/426.1
(Continued)

FOREIGN PATENT DOCUMENTS

CN    1755564    4/2006
CN    1937559    3/2007
(Continued)

OTHER PUBLICATIONS

Extended European Search Report for EP Application Serial No. 15160984.9, dated Jul. 4, 2016, 10 pages.
(Continued)

*Primary Examiner* — Kenneth M Lo
*Assistant Examiner* — Mohammed Shafayet
(74) *Attorney, Agent, or Firm* — Amin, Turocy & Watson, LLP

(57) ABSTRACT

A configuration management interface system is provided for standardizing communication between an external application and one or more hardware or emulated industrial controllers. The interface system reads one or more industrial control programs and presents available data tags defined by the control programs to a user via an interface screen. The user can select a subset of the available data tags that are to be exposed to the external application for data communication. Based on the selected data tags, controller configuration information read from the control programs, and additional configuration information provided by the user, the interface system generates a control unit file that acts as a communication bridge between the external application and the selected data tags residing on the industrial controllers. The control unit file can be used to interface the application (e.g., an industrial simulation or another type of application) with either hardware controllers or emulated controllers.

20 Claims, 16 Drawing Sheets

(52) U.S. Cl.
CPC .............. *G05B 2219/13185* (2013.01); *G05B 2219/15006* (2013.01); *G05B 2219/25057* (2013.01); *G05B 2219/25083* (2013.01)

(58) Field of Classification Search
CPC ........... G05B 2219/13185; G05B 2219/15006; G06F 9/4443
USPC ...................................................... 700/19, 83
See application file for complete search history.

(56) References Cited

U.S. PATENT DOCUMENTS

| | | | |
|---|---|---|---|
| 6,609,034 B1 * | 8/2003 | Behrens ................. | G06F 3/023 361/679.1 |
| 6,640,241 B1 * | 10/2003 | Ozzie ................. | H04L 12/1813 709/204 |
| 6,675,226 B1 * | 1/2004 | Nair ................... | G05B 19/0423 709/249 |
| 7,133,908 B1 * | 11/2006 | Pajak ................. | H04L 41/0253 709/201 |
| 7,159,209 B1 | 1/2007 | Srinivasan et al. | |
| RE39,989 E * | 1/2008 | Morris ................ | H04B 7/18567 455/403 |
| 7,676,287 B2 * | 3/2010 | Eryurek .............. | G05B 23/0221 700/1 |
| 8,219,216 B2 * | 7/2012 | Klug .................. | G05B 19/0423 345/418 |
| 8,275,847 B2 | 9/2012 | Lewis | |
| 2001/0053992 A1 | 12/2001 | Eto et al. | |
| 2002/0133270 A1 | 9/2002 | Hung et al. | |
| 2002/0178159 A1 | 11/2002 | O'Brien | |
| 2003/0014387 A1 * | 1/2003 | Kreidler ............. | G05B 19/4183 |
| 2003/0083754 A1 * | 5/2003 | Tripathi ................. | G05B 15/02 700/2 |
| 2003/0212818 A1 | 11/2003 | Klein et al. | |
| 2004/0141517 A1 * | 7/2004 | Balasubramanian ... | H04L 12/56 370/462 |
| 2004/0230859 A1 | 11/2004 | Cochran et al. | |
| 2005/0010333 A1 * | 1/2005 | Lorton ................... | A01K 29/00 700/275 |
| 2005/0154477 A1 | 7/2005 | Martin et al. | |
| 2005/0193285 A1 | 9/2005 | Jeon | |
| 2006/0068762 A1 | 3/2006 | Baldwin et al. | |
| 2006/0294047 A1 * | 12/2006 | Johnston ............ | G05B 19/0426 |
| 2007/0019641 A1 | 1/2007 | Pai et al. | |
| 2008/0027704 A1 * | 1/2008 | Kephart ............ | G05B 19/41885 703/22 |
| 2008/0168092 A1 * | 7/2008 | Boggs ................. | G06F 17/5022 |
| 2008/0317058 A1 | 12/2008 | Williams | |
| 2009/0089227 A1 | 4/2009 | Sturrock et al. | |
| 2009/0183201 A1 | 7/2009 | Dasgupta | |
| 2009/0198350 A1 * | 8/2009 | Thiele ................. | G05B 13/042 700/30 |
| 2009/0265036 A1 * | 10/2009 | Jamieson ........... | G05B 19/0426 700/259 |
| 2009/0326892 A1 * | 12/2009 | Lin ........................ | G05B 17/02 703/7 |
| 2010/0070852 A1 | 3/2010 | Li | |
| 2010/0256794 A1 * | 10/2010 | McLaughlin ...... | G05B 19/4183 700/110 |
| 2010/0256795 A1 * | 10/2010 | McLaughlin ...... | G05B 19/4183 700/110 |
| 2010/0257228 A1 * | 10/2010 | Staggs ................. | G06F 9/5027 709/203 |
| 2011/0066298 A1 | 3/2011 | Francino | |
| 2011/0103393 A1 | 5/2011 | Meier et al. | |
| 2011/0134930 A1 | 6/2011 | McLaren et al. | |
| 2011/0145836 A1 * | 6/2011 | Wheeler ................. | G06F 9/542 719/314 |
| 2011/0264622 A1 * | 10/2011 | Vargas ................ | H04L 29/06 707/618 |
| 2012/0143378 A1 * | 6/2012 | Spears ................. | H04L 12/282 700/275 |
| 2012/0144202 A1 | 6/2012 | Counterman | |
| 2012/0166963 A1 | 6/2012 | Kohli et al. | |
| 2012/0232869 A1 * | 9/2012 | Maturana .............. | G05B 17/02 703/7 |
| 2012/0331104 A1 * | 12/2012 | Akiyama ................ | H04L 67/12 709/217 |
| 2013/0067090 A1 * | 3/2013 | Batrouni ............ | H04L 67/1097 709/226 |
| 2013/0081146 A1 * | 3/2013 | Hakozaki ........... | H04N 1/00222 726/28 |
| 2013/0110298 A1 * | 5/2013 | Beveridge ............... | F01K 13/02 700/287 |
| 2013/0123965 A1 * | 5/2013 | Cooper ................ | G05B 19/042 700/97 |
| 2013/0124253 A1 * | 5/2013 | Cooper ................ | G06Q 10/067 705/7.26 |
| 2013/0150986 A1 | 6/2013 | Timsjo et al. | |
| 2013/0191106 A1 | 7/2013 | Kephart et al. | |
| 2013/0211559 A1 * | 8/2013 | Lawson ........... | G06Q 10/06315 700/83 |
| 2013/0211870 A1 * | 8/2013 | Lawson ........... | G06Q 10/06315 705/7.25 |
| 2013/0212420 A1 * | 8/2013 | Lawson ............. | G05B 19/4185 713/400 |
| 2013/0225151 A1 * | 8/2013 | King ................. | H04M 1/72577 455/419 |
| 2013/0227446 A1 * | 8/2013 | Zala .......................... | G06F 8/38 715/762 |
| 2013/0262678 A1 | 10/2013 | Tung et al. | |
| 2013/0266193 A1 | 10/2013 | Tiwari et al. | |
| 2013/0269020 A1 | 10/2013 | Griffin et al. | |
| 2013/0283151 A1 | 10/2013 | Deguzman et al. | |
| 2013/0290952 A1 * | 10/2013 | Childers, Jr. ......... | G06F 9/5077 718/1 |
| 2014/0047107 A1 | 2/2014 | Maturana et al. | |
| 2014/0115592 A1 | 4/2014 | Frean et al. | |
| 2014/0147064 A1 | 5/2014 | Omori | |
| 2014/0156234 A1 * | 6/2014 | Maturana ........... | G05B 19/0426 703/2 |
| 2014/0157368 A1 | 6/2014 | Shah et al. | |
| 2014/0164124 A1 | 6/2014 | Rhoads | |
| 2014/0207868 A1 * | 7/2014 | Gordon ............. | G05B 19/4185 709/204 |
| 2014/0257528 A1 | 9/2014 | Perez et al. | |
| 2014/0269531 A1 * | 9/2014 | Luna ..................... | H04W 72/00 370/329 |
| 2014/0274005 A1 * | 9/2014 | Luna ..................... | H04M 3/56 455/416 |
| 2014/0280796 A1 | 9/2014 | Pijewski | |
| 2014/0282015 A1 | 9/2014 | Nixon et al. | |
| 2014/0337473 A1 * | 11/2014 | Frusina ................... | H04L 5/003 709/217 |
| 2015/0220080 A1 * | 8/2015 | Nixon .................. | G05B 19/418 700/19 |
| 2016/0023351 A1 | 1/2016 | Kuffner et al. | |
| 2016/0142396 A1 | 5/2016 | McRoberts et al. | |
| 2017/0212562 A1 | 7/2017 | Wang et al. | |

FOREIGN PATENT DOCUMENTS

| | | |
|---|---|---|
| CN | 103293953 | 9/2013 |
| CN | 203466840 | 3/2014 |
| CN | 103701953 A | 4/2014 |
| EP | 1422619 | 5/2004 |
| EP | 2228965 | 9/2010 |
| EP | 2541354 | 1/2013 |
| EP | 2592812 | 5/2013 |
| EP | 2660667 | 11/2013 |
| EP | 2704401 | 3/2014 |

OTHER PUBLICATIONS

European Office Action for EP Application Serial No. 15160984.9, dated Aug. 8, 2016, 2 pages.
Extended European Search Report for EP Application Serial No. 15160944.3, dated Jul. 8, 2016, 9 pages.

(56) References Cited

OTHER PUBLICATIONS

European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.
Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.
Office Action for U.S. Appl. No. 14/525,131, dated Jun. 28, 2016, 36 pages.
Office Action for U.S. Appl. No. 14/665,128, dated Jul. 20, 2016, 9 pages.
Office Action for U.S. Appl. No. 14/634,174, dated Aug. 4, 2016, 11 pages.
Steiner, J. G., et al., "Kerberos: An Authentication Service for Open Network Systems," Proceedings of the Winter Usenix Conference, Feb. 9, 1988, pp. 191-202.
Office Action from U.S. Appl. No. 14/525,144, dated Sep. 9, 2016, 28 pages.
Extended European Search Report for EP Application Serial No. 15160989.8, dated Sep. 22, 2016, 5 pages.
Extended European Search Report for EP Application Serial No. 15160988.0, dated Sep. 16, 2016, 9 pages.
European Office Action for EP Application Serial No. 15160941.9, dated Aug. 29, 2016, 2 pages.
European Office Action for EP Application Serial No. 15160980.7, dated Sep. 5, 2016, 2 pages.
Office Action for U.S. Appl. No. 14/525,131, dated Oct. 4, 2016, 56 pages.
Office Action for U.S. Appl. No. 14/634,174, dated Nov. 4, 2016, 25 pages.
European Office Action for EP Application Serial No. 15160988.0, dated Oct. 24, 2016, 2 pages.
Office Action for Chinese Application No. 201510136419.4, dated Apr. 21, 2017, 10 pages.
Office Action for Chinese Application No. 201510135130.0, dated May 3, 2017, 15 pages.
Office Action for U.S. Appl. No. 14/478,974, dated Jun. 15, 2017, 11 pages.
Office Action for U.S. Appl. No. 14/619,933 dated May 15, 2017, 11 pages.
Office Action for Chinese Application No. 201510138371.0 dated May 4, 2017, 15 pages.
Final Office Action for U.S. Appl. No. 14/525,149, dated Jul. 7, 2017, 77 pages.
Office Action for U.S. Appl. No. 14/525,131, dated Feb. 3, 2017, 21 pages.
Office Action for U.S. Appl. No. 14/525,144, dated Feb. 3, 2017, 42 pages.
Office Action for U.S. Appl. No. 14/525,149, dated Feb. 27, 2017, 76 pages.
Office Action for U.S. Appl. No. 14/634,174, dated Feb. 3, 2017, 12 pages.
Office Action for U.S. Appl. No. 14/562,233, dated Jan. 25, 2017, 25 pages.
Chinese Office Action and English Translation thereof dated Jul. 12, 2017, for Chinese Application Serial No. 201510138210.1, 17 pages.
Final Office Action for U.S. Appl. No. 14/562,233, dated Jul. 28, 2017, 33 pages.
Office Action for U.S. Appl. No. 14/525,149 dated Oct. 5, 2017, 88 pages.
European Office Action for European Application Serial No. 15160984.9 dated Feb. 15, 2018, 7 pages.
European Office Action for European Application Serial No. 15160941.9, dated Jan. 15, 2018, 5 pages.
European Office Action for European Application Serial No. 15160868.4, dated Jan. 10, 2018, 8 pages.
European Office Action for European Application Serial No. 15160924.5, dated Feb. 8, 2018, 5 pages.
European Office Action for European Application Serial No. 15160944.3, dated Feb. 15, 2018, 7 pages.
European Office Action for European Application Serial No. 15160980.7, dated Feb. 15, 2018, 8 pages.
European Office Action for European Application Serial No. 15160987.2, dated Feb. 12, 2018, 7 pages.
European Office Action for European Application Serial No. 15160988.0, dated Feb. 9, 2018, 5 pages.
Office Action for U.S. Appl. No. 15/431,128 dated Oct. 18, 2017, 37 pages.
Office Action for U.S. Appl. No. 14/562,233 dated Dec. 29, 2017, 36 pages.
Office Action for Chinese Application Serial No. 201510138371.0 dated Nov. 14, 2017, 5 pages.
Non-Final Office Action received for U.S. Appl. No. 15/271,752 dated Apr. 13, 2018, 56 pages.
Final Office Action received for U.S. Appl. No. 14/562,233 dated Jun. 15, 2018, 35 pages.

\* cited by examiner

FIG. 6

| Name | Type | In/Out | Description | Controller |
|---|---|---|---|---|
| <TagName1> | BOOL | INPUT | <Description1> | <Controller1> |
| <TagName2> | REAL | INPUT | <Description2> | <Controller1> |
| <TagName3> | REAL | OUTPUT | <Description3> | <Controller1> |
| ... | ... | ... | ... | ... |
| <TagName52> | BOOL | OUTPUT | <Description52> | <Controller2> |
| <TagName53> | BOOL | INPUT | <Description53> | <Controller2> |
| <TagName54> | REAL | OUTPUT | <Description54> | <Controller2> |

602

MULTIPLE CONTROLLERS CONFIGURATION MANAGEMENT INTERFACE FOR SYSTEM CONNECTIVITY

CROSS-REFERENCE TO RELATED APPLICATIONS

This application claims priority to U.S. Provisional Application Ser. No. 61/970,798, filed on Mar. 26, 2014, entitled "INDUSTRIAL CLOUD INFRASTRUCTURE FOR DATA INGESTION, MODELING, PROCESSING, ANALYTICS, AND REPORTING," the entirety of which is incorporated herein by reference.

BACKGROUND

The subject matter disclosed herein relates generally to industrial controller communication, and, for example, to a system for managing communication between one or more industrial controllers and an external application

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a control program import component configured to import one or more industrial control programs and to identify a set of available data items defined by the one or more industrial control programs; an interface component configured to render the set of available data items on an interface display and to receive selection input selecting a subset of the available data items via interaction with the interface display; and a control unit generation component configured to generate, based on the subset of the available data items and controller configuration information read from the one or more industrial control programs, a control unit file configured to communicatively expose the subset of the available data items within one or more industrial controllers to an application.

Also, one or more embodiments provide a method for creating a communication bridge to one or more industrial controllers, comprising importing, by a system comprising a processor, one or more industrial control programs; analyzing, by the system, the one or more industrial control programs to identify available data tags and controller configuration information defined by the one or more industrial control programs; displaying, by the system, the available data tags on a tag selection display; receiving, by the system via interaction with the tag selection display, selection input that selects a subset of the available data tags; receiving, by the system, information identifying a type of application that is to communicate with one or more industrial controllers respectively executing the one or more industrial control programs; and generating, by the system, a control unit file based on the subset of the available data tags and the controller configuration information, wherein the control unit file is configured to communicatively interface data points of the application with the subset of the available data tags on the one or more industrial controllers.

Also, according to one or more embodiments, a non-transitory computer-readable medium is provided having stored thereon instructions that, in response to execution, cause a system to perform operations, the operations comprising importing one or more industrial control programs; identifying available data items and controller configuration information defined by the one or more industrial control programs based on analysis of the one or more industrial control programs; displaying the available data items on a configuration display; receiving via interaction with the configuration display, selection input that selects a subset of the available data items; receiving information identifying a type of application that is to communicate with one or more industrial controllers respectively executing the one or more industrial control programs; and generating a control unit file based on the subset of the available data items and the controller configuration information, wherein the control unit file is configured to communicatively expose the subset of the available data items to the application for exchange of data.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 6 is an example format for displaying available global data tags.

DETAILED DESCRIPTION

Figure 1:
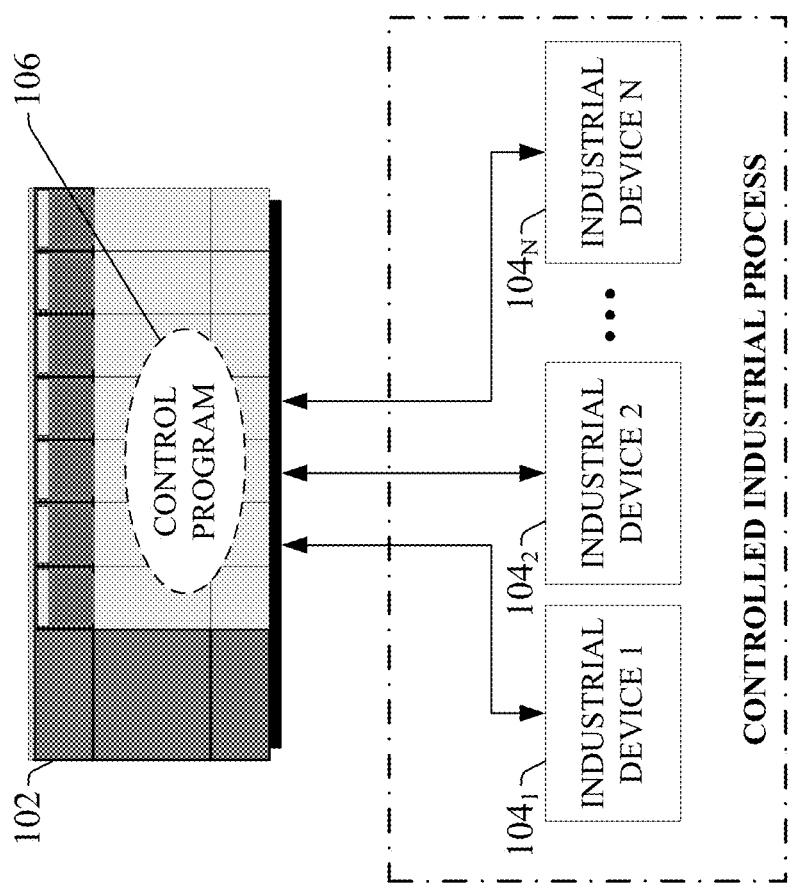
FIG. 1 is a simplified diagram illustrating an example automated industrial process controlled by an industrial controller.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. FIG. 1 is a simplified diagram illustrating an example automated industrial process controlled by an industrial controller 102. Industrial controller 102 interacts with industrial devices 104 on the plant floor to control one or more automated processes relating to such objectives as product manufacture, material handling, batch processing, supervisory control, and other such applications. Industrial controller 102 stores and executes a user-defined control program 106 to effect decision-making in connection with the controlled process. Such programs can include, but are not limited to, ladder logic, sequential function charts, function block diagrams, structured text, or other such programming structures.

Figure 2:
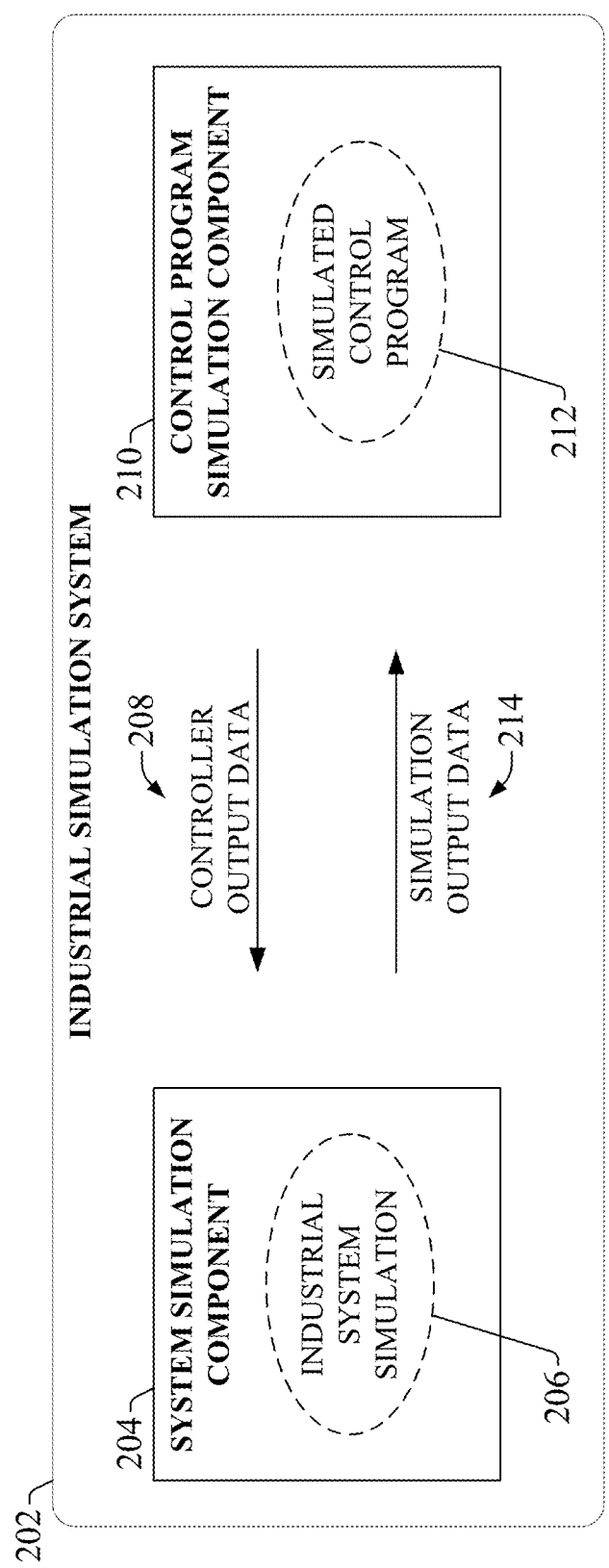
FIG. 2 is block diagram of an example industrial simulation system.

Many system designers use simulations of a plant or industrial system to validate an industrial control program prior to deployment, or to demonstrate the controlled industrial system to other engineers or end customers. FIG. 2 is block diagram of an example industrial simulation system 202. Industrial simulation system 202 includes a system simulation component 204 that executes an industrial system simulation 206, which emulates various aspects of a physical automation system to be regulated by an industrial controller. Industrial simulation system 202 also includes a control program simulation component 210 that executes a simulated control program 212 analogous to the industrial control program that will be installed and executed on the physical industrial controller used to monitor and control the real industrial automation system. The industrial system simulation 206 interfaces with the simulated control program 212 being validated to exchange simulated I/O data (e.g., controller output data 208 and simulation output data 214), thereby simulating real-time control. For example, if the industrial system simulation 206 comprises a model of an industrial robot arm, the simulated control program 212 can be configured to manage movement of the arm.

Industrial system simulation 206 can be, for example, a dynamic model representing the plant or automation system to be regulated by the industrial controller program. Industrial system simulation 206 can mathematically model the system to be regulated by generating digital and analog I/O values representing, for example, sensor outputs, metering outputs, or other plant data analogous to the data expected to be generated by the physical system being modeled. Simulations of industrial devices typically model parameters and physical attributes of the industrial devices making up the automation system to ensure proper imitation. Some of these parameters can be used as manipulating and controlled variables; i.e., the inputs and outputs of the simulation. Simulation output data 214 is provided to the simulated control program 212, which receives this data as one or more virtual physical inputs. Simulated control program 212 processes these inputs according to user-defined algorithms, and generates digital and/or analog controller output data 208 based on the processing. This controller output data 208 represents the physical outputs that would be generated by an industrial controller executing a control program that implements the algorithms encoded by simulated control program 212 and which would be transmitted to the hardwired field devices comprising the automation system (e.g., PID loop control outputs, solenoid energizing outputs, motor control outputs, etc.). The controller output data 208 is provided to the appropriate input points of the system simulation component 204, which updates the simulation output data 214 accordingly. This simulation technique can be used to test and debug control routines without putting field equipment and machinery at risk, to simulate modifications to plant or machine operations and estimate how such modifications affect certain performance or financial metrics, or to perform other such analytics.

Figure 3:
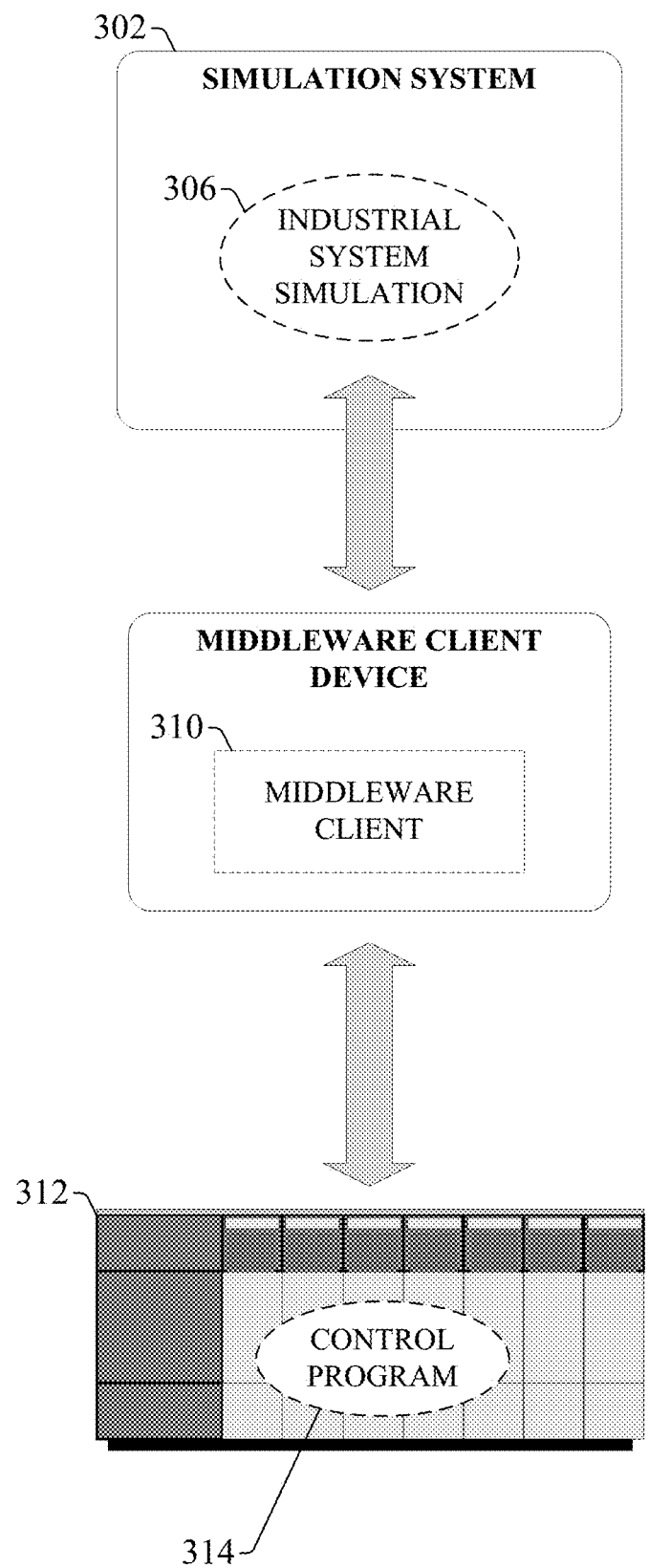
FIG. 3 is a diagram of a simplified example hardware-in-the-loop simulation.

The simulation approach illustrated in FIG. 2 requires the control program to be simulated in the industrial simulation system 202 using the control program development tools provided in the simulation environment. Typically, this means that the simulated control program 212 is not in a format that can be downloaded to a hardware controller, but rather is in a format native to the simulation environment. Consequently, once the simulated control program 212 is validated, the actual controller program must be created in a separate program development environment and downloaded to the industrial controller. This conversion process adds time to the development process, and also raises the possibility of programming fidelity errors when translating the simulated control program 212 to an actual control program that can be downloaded and executed on the hardware controller Hardware-in-the-loop simulations can allow the actual control program—executed by the actual industrial controller—to interact with the industrial system simulation, eliminating the need to simulate the control program in the simulation environment. FIG. 3 is a diagram of a simplified example hardware-in-the-loop simulation. In this example, an industrial controller 312 executes a control program 314 to be used to control an automation system being simulated by industrial simulation system 302, while industrial system simulation 306 executes on simulation system 302. The controller 312 and simulation system 302 are networked to a middleware communication client 310 (e.g., an OLE for process control (OPC) client or other such middleware client), which communicatively interfaces the controller's I/O data with the simulated inputs and outputs of industrial system simulation 306. Using this configuration, the actual controller hardware and software is used to control industrial system simulation 306, driven by control program 314. However, the use of middleware clients often introduces excessive communication latency between the controller 312 and industrial system simulation 306, which may cause synchronization errors between the two systems and adversely affect the fidelity of the simulation.

To address these and other issues, one or more embodiments of the present disclosure provide a controller configuration management system that can be used to standardize communication with one or more hardware or emulated controllers. According to one or more embodiments, a configuration management interface system can import one or more industrial control programs to be installed and executed on respective one or more industrial controllers. The configuration management interface system can identify the available data items (e.g., data tags) defined in the control programs and present the data items to a user for selection. The user can interact with the interface system to select a subset of the available data items to be included in a control unit file generated by the interface system. Based on the user's selection and other configuration input provided by the user, the configuration management interface system generates the control unit file, which can serve as a standardized communication interface between the selected data items in the actual or emulated industrial controller and an external or third-party application, where the third-party application may comprise, for example, a system simulation, a data collection and/or processing application, a reporting application, a product life cycle management (PLM) application, a visualization application, or other such application. In general, the control unit file can act as a connectivity interface for data and functionality of a real (e.g., hardware) or emulated industrial controller.

To facilitate data exchange with the specified data items, the control unit file can interact with a public application programming interface implemented on the hardware or emulated controller. Since data items from multiple control programs—corresponding to multiple controllers—can be specified via the configuration management interface system, the control unit file generated by the interface can be used to manage communication with multiple controllers.

Figure 4:
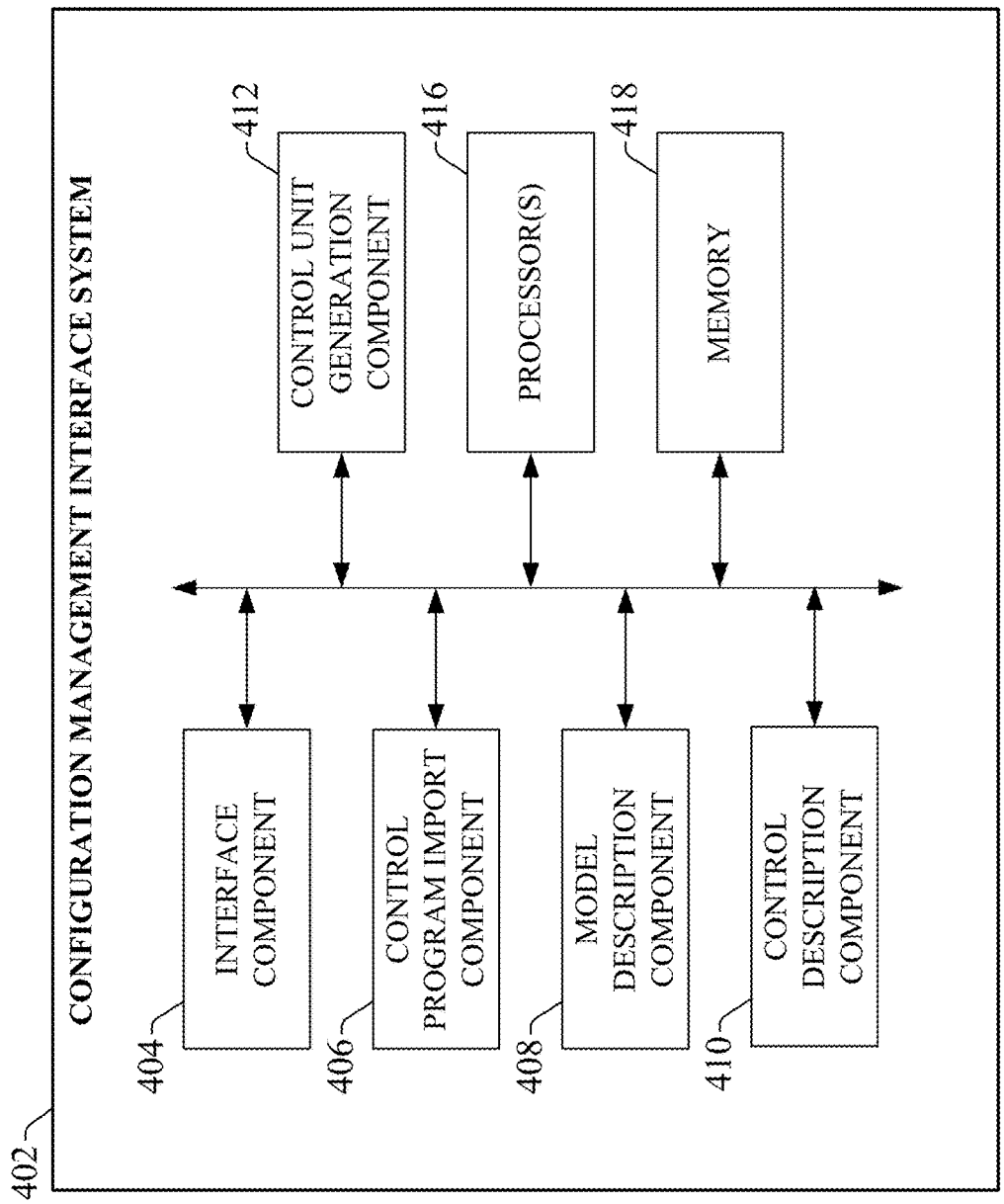
FIG. 4 is a block diagram of an example configuration management interface system.

FIG. 4 is a block diagram of an example configuration management interface system 402 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Configuration management interface system 402 can include an interface component 404, a control program import component 406, a model description component 408, a control description component 410, a control unit generation component 412, a tag monitoring component 414, one or more processors 416, and memory 418. In various embodiments, one or more of the interface component 404, control program import component 406, model description component 408, control description component 410, control unit generation component 412, tag monitoring component 414, the one or more processors 416, and memory 418 can be electrically and/or communicatively coupled to one another to perform one or more of the functions of the configuration management interface system 402. In some embodiments, components 404, 406, 408, 410, 412, and 414 can comprise software instructions stored on memory 418 and executed by processor(s) 416. Configuration management interface system 402 may also interact with other hardware and/or software components not depicted in FIG. 4. For example, processor(s) 416 may interact with one or more external user interface devices, such as a keyboard, a mouse, a display monitor, a touchscreen, or other such interface devices.

Interface component 404 can be configured to generate user interface displays for receiving input data from and rendering output data to the user. These user interface displays can include, for example, control unit configuration screens for receiving configuration input from the user for creation of a control unit file, data tag selection screens for presenting available data tags to the user and for receiving selection input that selects a subset of the available data tags for inclusion in the control unit file, data monitoring screens for monitoring data values and statuses associated with each selected data tag while data is being exchanged with the controller via the control unit file, or other such configuration screens.

Control program import component 406 can be configured to import one or more industrial control programs into the configuration management interface system 402. The control program import component 406 can also analyze the imported control programs and identify the data items or tags available for selection as inputs from and outputs to the control programs. The model description component 408 can be configured to generate a model description file to be included in the control unit file based on the user's configuration input. The model description file generates a public interface that exposes the data tags selected by the user to the third-party application that communicates with the industrial controller via the control unit file. The control description component 410 can be configured to generate a control description file to be included in the control unit file based on the user's configuration input. The control description file can define information used by the control unit file to access the selected data tags on the industrial controller. For example, the control description file can define, for each available data item or tag, a communication path to the device (i.e., the industrial controller) on which the data tag resides, as well as to the particular data item on the controller. The control description file can also contain additional configuration information for the control unit file, including information regarding the global set of data tags available in all imported programs, which can be used for subsequent re-configuration of the control unit file's core.

The control unit generation component 412 can be configured to generate the control unit file based on the user's configuration input and data tag selections. The control unit file can include the model description file and control description file, as well as control information used to maintain communication with the industrial controller's interface. The one or more processors 416 can perform one or more of the functions described herein with reference to the systems and/or methods disclosed. Memory 418 can be a computer-readable storage medium storing computer-executable instructions and/or information for performing the functions described herein with reference to the systems and/or methods disclosed.

Figure 5:
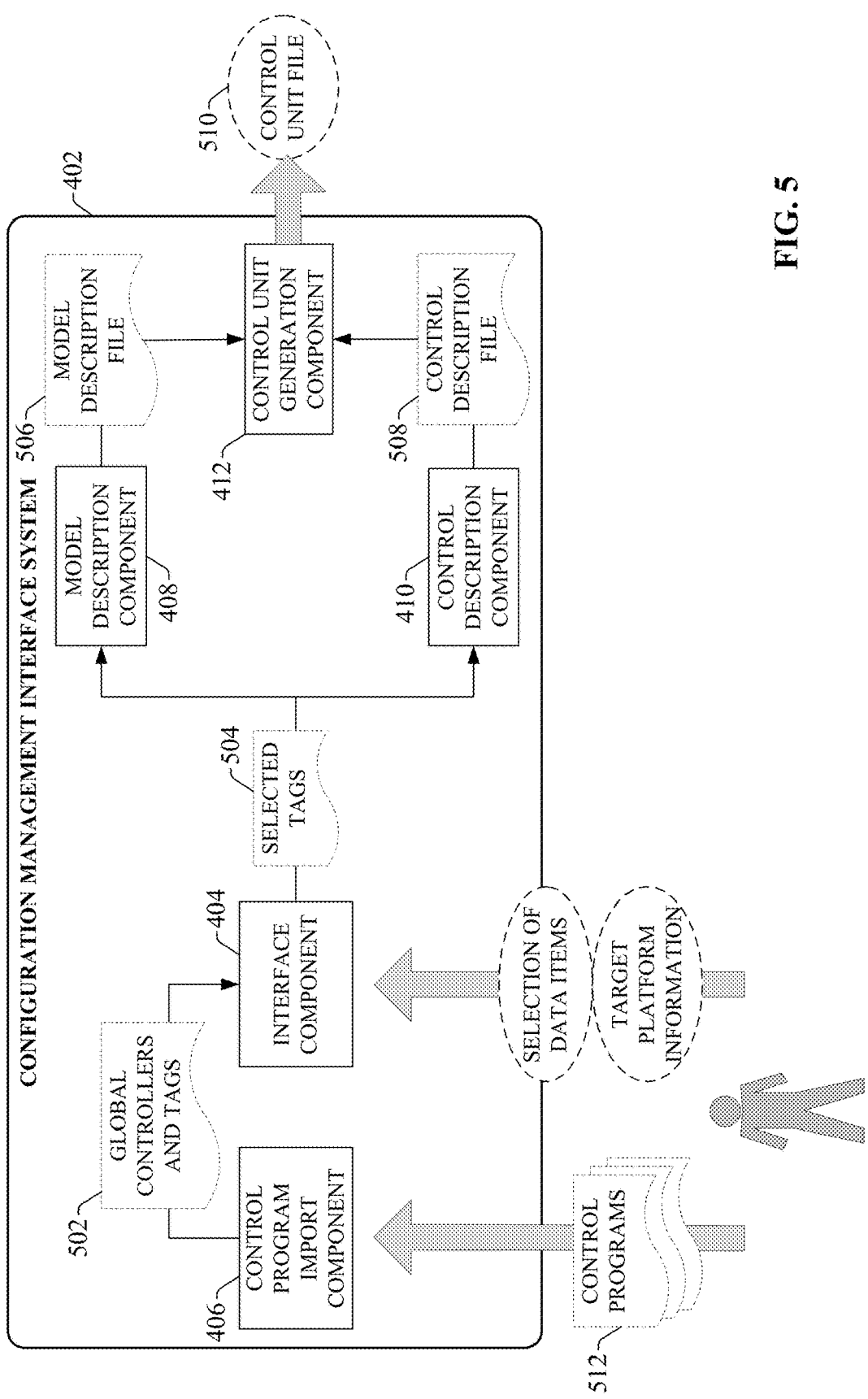
FIG. 5 is a diagram illustrating creation of a control unit file by a configuration management interface system.

FIG. 5 is a diagram illustrating creation of a control unit file 510 by the configuration management interface system 402. The control unit file 510 is configured to interact with an application program interface (API) that is part of an actual or emulated industrial controller's software or firmware in order to expose selected data items on the industrial controller to external or third-party platforms in a standardized manner. To this end, a user can import one or more control programs 512 into the configuration management interface system 402 using the control program import component 406. The control programs 512 can comprise industrial control programs that have been developed in a control program development environment, and which have been or are to be downloaded to one or more hardware or emulated industrial controllers. The control programs 512 can comprise programs for multiple different industrial controllers, such that the resulting control unit file 510 generated by the interface system 402 will act as a single communication interface for the multiple industrial controllers.

The control programs 512 each define the control logic for monitoring and controlling the industrial devices comprising respective industrial automation systems, as well as identification and configuration information for the controllers on which each control program 512 is to be executed, and the available data items (or data tags) implemented in the respective programs. For example, the data items may correspond to digital or analog input data received from input devices in the field (e.g., telemetry devices that measure aspects of the controlled industrial process, such as temperatures, flow rates, pressures, etc.; manual control input devices, safety input devices, etc.); digital or analog output values for controlling signals to output devices in the field (e.g., actuators, valves, stack lights, motor drives, etc.); internal registers used by the control program for calculated values; configuration registers; or other such data items.

The control program import component 406 is configured to analyze the imported control programs 512 to identify the controllers and associated data items defined by each of the control programs, and expose this global set of controllers and associated tags 502 to the user. The interface component 404 can present the list of controllers and associated tags to the user for selection. For example, the interface component 404 may generate and display a list of global data tags similar to tag list 602 illustrated in FIG. 6. The list generated by the interface component 404 (and rendered to the user via an appropriate tag selection screen generated by the interface component 404) lists the global set of data tags available in the respective controllers, identifying each data tag's name, data type, description, and associated controller, as well as an indication of whether each tag is defined as an input or an output in the control program. The control program import component 406 determines the data used to populate each of the Name, Type, In/Out, Description, and Controller fields based on the tag definition information read from the control programs. It is to be appreciated that list 602 is only intended to be exemplary, and that any format for presenting the global set of available data tags is within the scope of one or more embodiments of this disclosure. For example, in some embodiments the available data tags may be presented in the form of a collapsible, hierarchical list that categorizes each available data tag under its associated controller, such that selection of a controller from a list causes the data tags available in that controller's program to be displayed for individual tag selection.

The interface component 404 allows the user to interact with the list of global tags to select the particular data items that are to be exposed to an external (e.g., third-party) application. The selected data items will comprise the data items on the respective controllers that will be made available by the control unit file 510 for read/write access by the external application. Only the tags selected by the user will be made available to the external application by the control unit file 510. In addition, the interface component 404 may also prompt the user for information regarding the target platform on which the control unit file 510 is to be used. The target platform is the hardware and/or software platform that executes the external application that is to communicate with the industrial controllers to read from or write to the selected data items. For example, if the external application is a reporting or visualization application that executes on a server, the user may identify that the operating system installed on the server on which the application will execute. In another example, if the external application is a simulation tool that will exchange data with the industrial controller to facilitate validation of a control program or an industrial system design, the user may specify the simulation environment that will be exchanging information with the industrial controller. In some embodiments, the user may also specify a data synchronization period defining how frequently data between the controller(s) and the external application should be synchronized, as well as other relevant information. The configuration management interface system 402 will leverage this information to create a control unit file 510 that exposes the selected data items to the particular target platform specified by the user.

Returning now to FIG. 5, information identifying the data tags selected by the user is provided to the model description component 408 and the control description component 410. Based on information about the data tags selected by the user, controller configuration information extracted from the control programs 512, and information identifying the target platform on which the control unit file 510 will be used, the model description component 408 generates a model description file 506 to be included as part of the control unit file 510. The model description file 506 is a main configuration file for the control unit file 510, and is configured to expose the data tags selected by the user to the external (e.g., third-party) application. For example, when the control unit file 510 is accessed by a third-party or external application, the model description file 506 identifies to the external application the available input and output data tags, as well as the types of the input and output data tags. A developer of the external application can configure the application to exchange information with any of the data tags exposed by the model description file 506, which provides a communication channel between the controller that contains the data tag and the external application. In general, the model description file 506 creates a public interface for accessing the data tags available on the industrial controller (either real or emulated), thereby allowing applications or simulation platforms from different vendors to read data from and write data to the selected data tags of the industrial controllers.

The control description file 508 comprises additional configuration information for the control unit file 510. The control description file 508 may include, for example, information about the global set of tags available in the control programs 512. Even though the user may not have selected all the available data tags to be exposed by the control unit file 510, the global tag information stored in the control description file 508 can allow additional tags to be selected for communication with external or third-party applications after the control unit file 510 is generated. The control description file 508 can also identify the communication channels from the control unit file 510 to the respective data tags in the industrial controllers. To this end, the control description file 508 can contain controller configuration information read from the control programs 512. This controller configuration information can include information about the communication APIs installed on each industrial controller, which are used to interface the controller with external control unit files. In general, the model description file 506 exposes the available and selected data tags to the external applications for read and/or write access, while the control description file 508 defines the communication pathways to those data tags between the industrial controllers and the platform running the control unit file 510.

Although the selected data tags may comprise data items in multiple controllers (corresponding to the multiple control programs 512), the model description component 408 and control description component 410 will generate a single model description file 506 and control description file 508 for a given control unit file 510 encompassing all selected data tags across the multiple industrial controllers.

Figure 7:
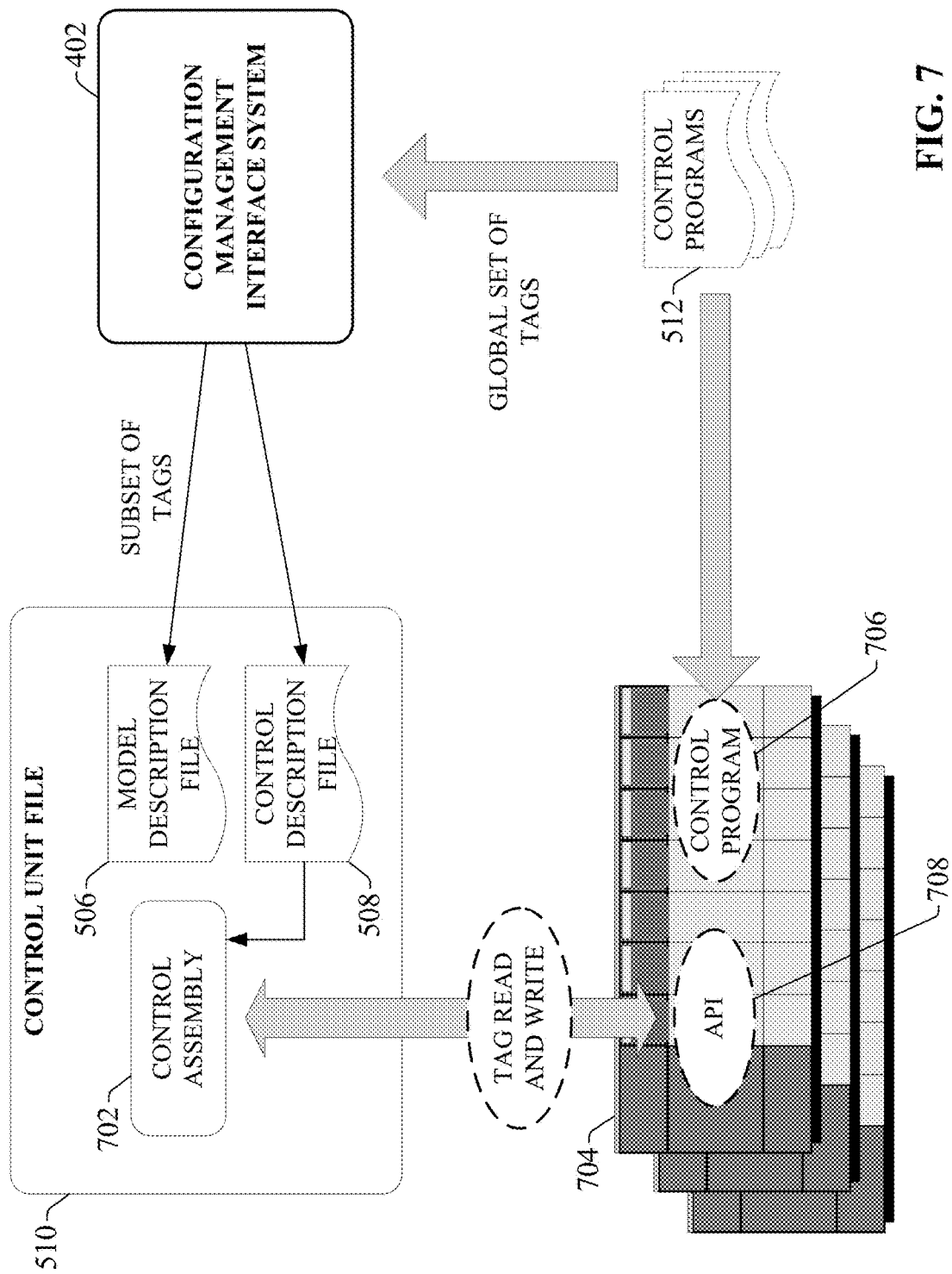
FIG. 7 is a diagram illustrating components of a control unit file.

Based on the information extracted from the control programs 512, the control unit generation component 412 generates the control unit file 510, which includes the model description file 506, the control description file 508, and additional information assembly information used to maintain communication with the APIs installed on the industrial controllers. FIG. 7 is a diagram illustrating components of the control unit file 510. In addition to the model description file 506 and control description file 508, the configuration management interface system 402 also generates a control assembly 702, which maintains communications with an API 708 installed on each industrial controller with which the control unit file 510 exchanges data. The interface system 402 can generate the control assembly 702 based in part on controller configuration information read from the control programs 512. The control assembly 702—which may be a dynamic link library file or another file type—can manage and maintain communication to the industrial controllers 704 based on information read from the control description file 508, which defines the communication paths to each data tag selected by the user during configuration of the control unit file 510.

The control assembly 702 is configured to interface with the API 708 installed on each of the industrial controllers 704 in order to read or set values of the selected data items associated with each control program 706 executing on the respective industrial controllers 704 (i.e., the control programs 512 that had been imported in the configuration management interface system 402 and parsed by the control program import component 406). In some embodiments, the control assembly 702 may also be configured to control execution of the control programs executing on the industrial controllers 704 in accordance with commands from the application communicating with the controllers through the control unit file 510. For example, the control assembly 702 may comprise functions that allow the control unit file 510 to start or stop program execution individually on each of the industrial controllers 704 in accordance with commands from the external application or direct user input to the control unit file. In some embodiments, the interface system 402 may also be configured to generate the control unit file 510 to include copies of the control program 512 used to generate the control unit file 510. In such embodiments, control assembly 702 can also be configured to download the control programs to the industrial controllers; e.g., during an initialization phase when communication between the control unit file 510 and the industrial controllers is established.

The control unit file 510—acting in conjunction with the APIs installed on the industrial controllers 704—acts as an adaptable, scalable bridge between one or more industrial controllers (either hardware controllers or emulated controllers) and one or more external or third-party applications or simulations, exposing the selected data items in a standard manner.

Figure 8:
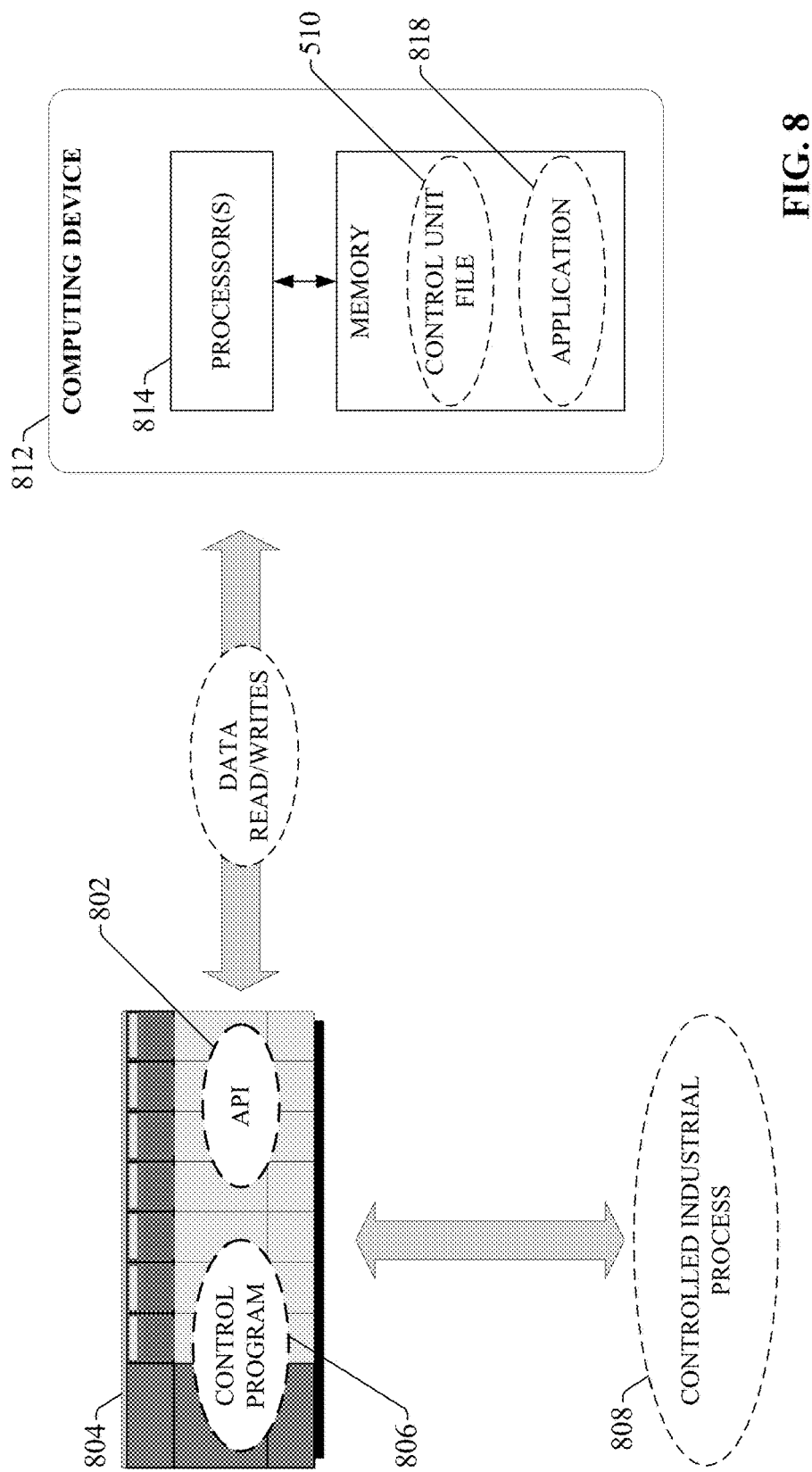
FIG. 8 is a diagram illustrating the use of a control unit file to exchange data between an external application and an industrial controller.

FIG. 8 is a diagram illustrating the use of control unit file 510 to exchange data between an external application 818 and an industrial controller 804. The external application 818 is installed on a computing device 812 (e.g., a desktop, laptop, or tablet computer, a mobile personal device, etc.) and is executed by the device's processor 814. The application 818 may comprise any type of application designed to read data from or write data to an industrial controller, including but not limited to a reporting application that collects industrial data (e.g., I/O device status information, telemetry readings, production statistics, etc.) from industrial controller 804 and imports the data into customized production reports, a visualization application that renders data retrieved from industrial controller 804 on one or more graphical display screens and writes data to selected data tags in response to user interaction with the display screens, a simulation application that models an industrial automation system to be controlled by industrial controller 804 and exchanges data with the controller to facilitate validation of the control program 806 and/or the modeled system, a data historian application that retrieves and archives status and production information from the industrial controller, or other such applications.

After generation of the control unit file 510 by the configuration management interface system as described above, the control unit file 510 is installed on the computing device 812 to serve as a communication bridge between application 818 and industrial controller 802. The computing device 812 may be communicatively networked to the industrial controller 804 over a wired or wireless network connection, over which data between the two devices is exchanged. The application 818 interfaces with the model description file 506 of the control unit file 510, and in particular is designed to interface with the available data items made available to the application by the model description file 506 (that is, the data items selected by the user during creation of the control unit file). The application can write data to selected input data tags exposed by the model description file, and the control unit file's control assembly 702 will send the written data to the appropriate data tag of the industrial controller 804—via API 802—based on the communication path information defined by the control description file 508. Similarly, the control assembly 702 can read values of output data tags from the industrial controller based on the communication path information defined by the control description file 508, and make those data values available to the application 818.

Figure 9:
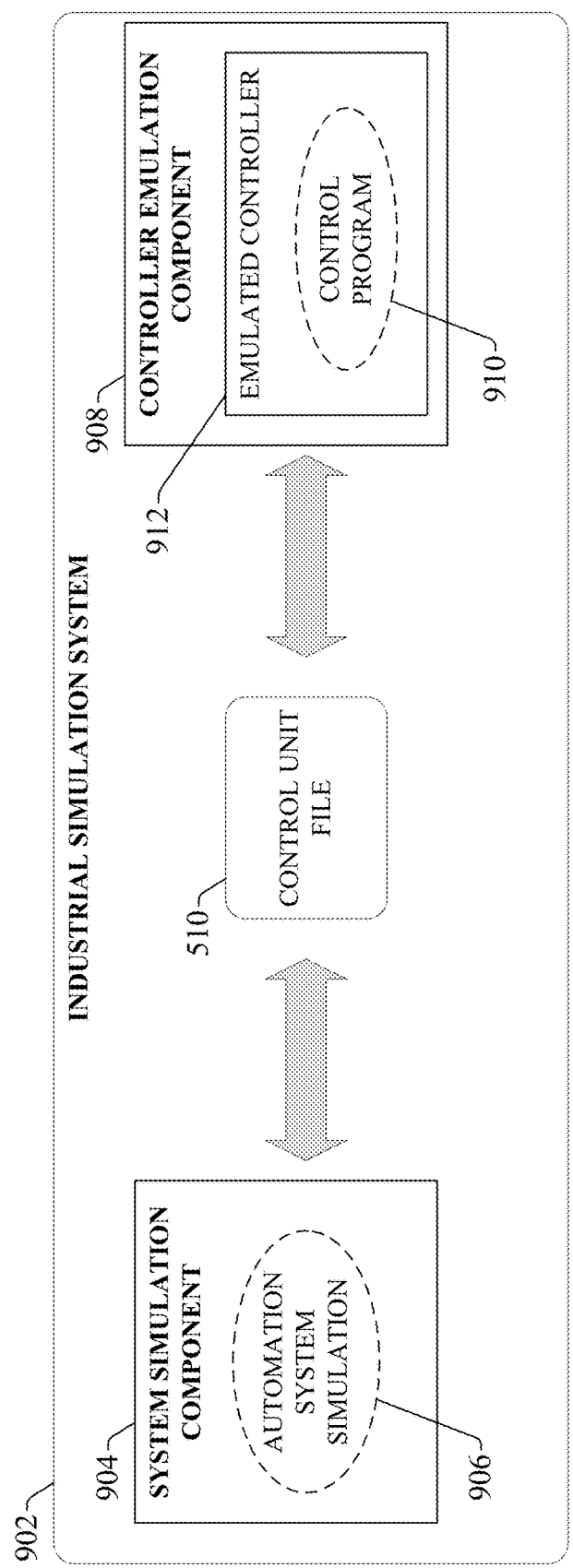
FIG. 9 is a diagram illustrating communication between an emulated industrial controller and an automation system simulation using a control unit file.

In addition to hardware controllers, such as industrial controller 804, the control unit file 510 can also be used to interface with emulated or virtual controllers that execute industrial control programs on a hardware and software platform that is not an industrial controller. Thus, the control unit file 510 can allow an industrial system simulation to interface with an emulated industrial controller executing within the same simulation environment. FIG. 9 is a diagram illustrating communication between an emulated industrial controller and an automation system simulation using a control unit file. In this example, industrial simulation system 902 comprises a system simulation component 904 that executes an automation system simulation 906, which models an automation system to be controlled by an industrial controller. The industrial simulation system 902 also comprises a controller emulation component 908 that hosts an emulated industrial controller 912. The emulated industrial controller 912 emulates the operating environment of an actual industrial controller to be deployed in the plant environment to monitor and control the automation system being modeled by automation system simulation 906.

By simulating the operating environment of the actual controller, the emulated industrial controller 912 is able to execute the same control program 910 that is to be installed on the hardware controller without the need to download and run the control program on the hardware controller itself. For example, the controller emulation component 908 can allow the user to model the actual industrial controller by specifying the processor type and the I/O modules installed in the controller's chassis, and to enter the same configuration settings to be used on the actual controller. The user can then import the control program 910 into the resulting emulated industrial controller 912, which executes the control program and simulates the controller behavior in response to execution of the program. Alternatively, since the emulated industrial controller 912 simulates the controller's operating environment, the user can connect a program development tool (e.g., the same development tool used to develop control programs for the actual controller) to the industrial simulation system 902 and interface the development tool with the emulated industrial controller 912, and build the program 910 directly on the emulated industrial controller 912. The emulated industrial controller 912 will execute the control program 910 in the same manner as the hardware controller, but using the memory and processing resources of the platform running the industrial simulation system. For example, if the control program 910 is a ladder logic program, the emulated controller will scan the logic rungs sequentially and process or control the states of the emulated I/O module inputs and outputs in a manner similar to the hardware controller.

To facilitate data exchange between the emulated controller's inputs and outputs and those of the automation system simulation, the configuration management interface system 402 can be used to generate a control unit file 510 using the techniques described above. For example, when creating the control unit file 510, the user can specify which of the available data tags available in the control program 910 are to be exposed to the automation system simulation 906, as well as the type of simulation system that will be interfacing with the emulated industrial controller 912. The interface system 402 can also allow the user to specify other simulation parameters; e.g., a synchronization period defining a frequency of data updates between the automation system simulation 906 and the control program 910. Once created, the control unit file 510 can be imported into the industrial simulation system 902 in order to act as a communication channel between the automation system simulation and the emulated industrial controller 912. For example, the simulation developer can tie selected inputs and outputs of the automation system simulation 906 to selected input and output data tags of the control program, which are exposed to the simulation 906 by the model description file 506 of the control unit file 510. Similar to the hardware controller configuration illustrated in FIG. 6, the control assembly 702 of the control unit file 510 can access the data values of the emulated controller's data tags by interfacing with an API integrated with the emulated industrial controller 912.

In one or more embodiments, the control unit file 510 can also monitor and display values of the selected data items during the simulation. In such embodiments, the control unit file 510 can generate and render a monitoring display within the development window of the industrial simulation system 902. This monitoring display can render the names of the emulated controller's data tags that are being linked by the control unit file 510 to the automation system simulation, together with current values and statuses of each data tag. This allows the user to observe the statuses of the emulated controller's inputs and outputs during control of the simulated automation system.

In one or more embodiments, the configuration management interface system used to generate the control unit file 510 implemented in industrial simulation system can be an integrated component of the industrial simulation system itself. In such embodiments, the user can invoke the configuration management interface system from within the industrial simulation system's development window, import the control program 910 into the interface system, select the data tags to be linked to the automation system simulation, and generate the control unit file 510. Alternatively, the control unit file 510 can be generated by a stand-alone or separate configuration management interface system and imported into the industrial simulation system 902 to facilitate data exchange between the automation system simulation 906 and emulated industrial controller 912.

Also, since the control description file 508 of the control unit file 510 contains identification and communication information for all data tags available in the control program 910 (not only those selected for exposure by the model description file 506), the control unit file 510 can be modified by the user to select additional available data tags without re-importing the control program 910 into the configuration management interface system 402. For example, once the control unit file 510 has been created to expose a selected subset of all data tags available in the control program 910, the user may subsequently choose to access the list of available data tags and select additional data tags for exposure by the model description file 506. In response to appropriate user input received via interaction with the control unit file 510, the control unit file can present a data tag selection window listing all data tags available in the control program 910 (read from the control description file 508). The user may select the additional data tags to be exposed by the control unit file 510 via interaction with the window, and the control unit file 510 will update the model description file 506 to incorporate the newly selected data tags. In this way, the user may modify the control unit file 510 independently of the configuration management interface system and without the need to re-import the control programs 512 in order to identify the available data tags.

Unlike the simulation configuration depicted in FIG. 2, which executes a simulated control program 212 that cannot be deployed outside the simulation environment, the configuration depicted in FIG. 9 allows the same control program that will be downloaded to and executed on the hardware controller to be used for the simulation. This eliminates the need to separately develop the hardware control program after the simulated control program has been verified, since the verified program used to simulate the control system can subsequently be downloaded and executed on the hardware controller. The configuration depicted in FIG. 9 can also reduce or eliminate synchronization errors that are sometimes experienced when performing hardware-in-the-loop simulations (such as the simulation configuration depicted in FIG. 3), since the emulated controller and the automation system simulation both execute within the same simulation environment.

Figure 10:
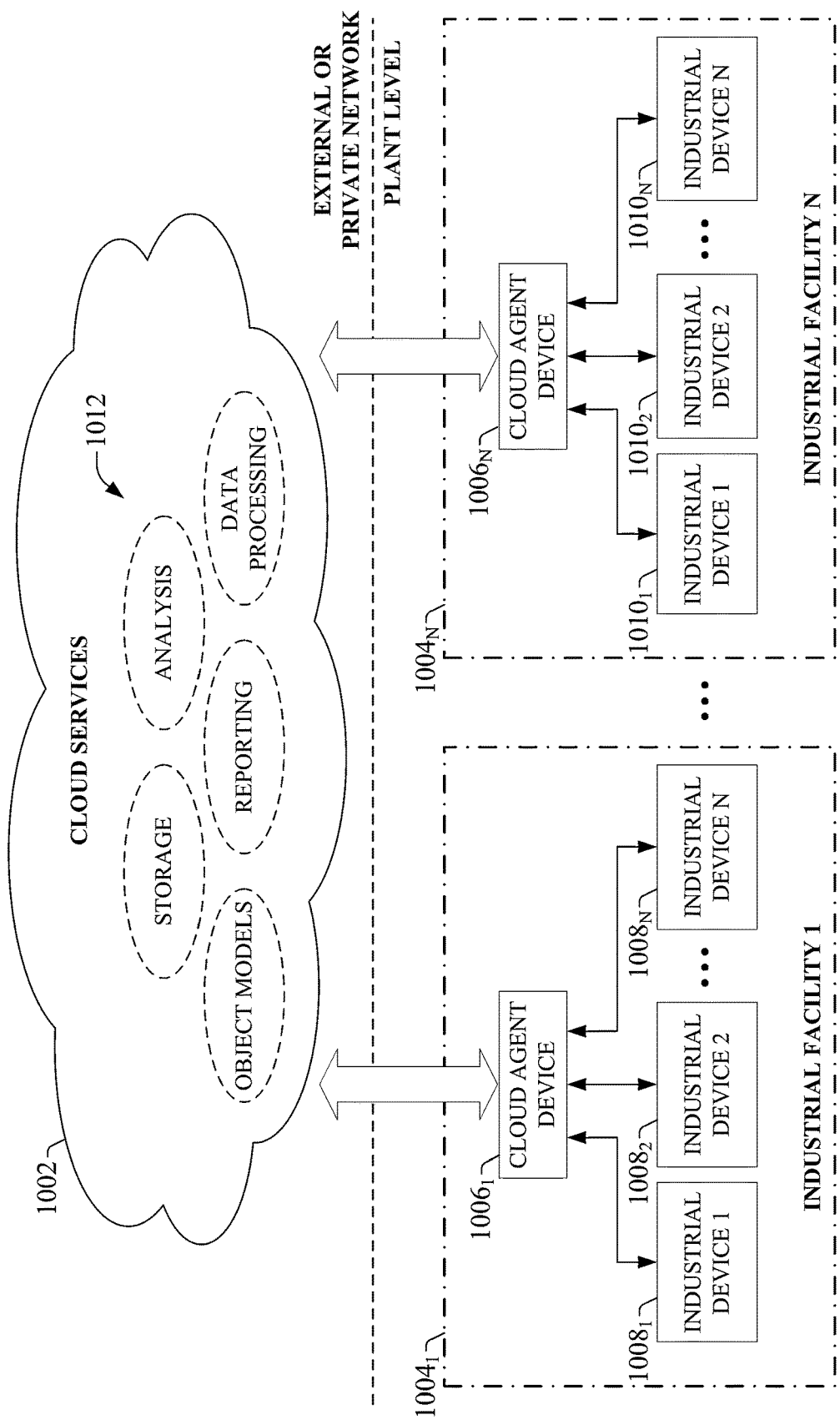
FIG. 10 is a diagram illustrating a high-level overview of an industrial enterprise that leverages cloud-based services.

The control unit file 510 can also be used to interface one or more industrial controllers with data collection and analytics services executing on a cloud platform. FIG. 10 illustrates a high-level overview of an industrial enterprise that leverages cloud-based services. The enterprise comprises one or more industrial facilities 1004, each having a number of industrial devices 1008 and 1010 in use. The industrial devices 1008 and 1010 can make up one or more automation systems operating within the respective facilities 1004. Exemplary automation systems can include, but are not limited to, batch control systems (e.g., mixing systems), continuous control systems (e.g., PID control systems), or discrete control systems. Industrial devices 1008 and 1010 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Example automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the example overview illustrated in FIG. 10 depicts the industrial devices 1008 and 1010 as residing in fixed-location industrial facilities 1004, the industrial devices 1008 and 1010 may also be part of a mobile control application, such as a system contained in a truck or other service vehicle.

In this example environment, on-premise cloud agent devices 1006 can collect data from industrial devices 1008 and 1010—or from other data sources, including but not limited to data historians, business-level systems, etc.—and send this data to cloud platform 1002 for processing and storage. Cloud platform 1002 can be any infrastructure that allows cloud services 1012 to be accessed and utilized by cloud-capable devices. Cloud platform 1002 can be a public cloud accessible via the Internet by devices having Internet connectivity and appropriate authorizations to utilize the services 1012. In some scenarios, cloud platform 1002 can be provided by a cloud provider as a platform-as-a-service (PaaS), and the services 1012 (such as the manifest system described herein) can reside and execute on the cloud platform 1002 as a cloud-based service. In some such configurations, access to the cloud platform 1002 and the services 1012 can be provided to customers as a subscription service by an owner of the services 1012. Alternatively, cloud platform 1002 can be a private or semi-private cloud operated internally by the enterprise, or a shared or corporate cloud environment. An exemplary private cloud can comprise a set of servers hosting the cloud services 1012 and residing on a corporate network protected by a firewall.

Cloud services 1012 can include, but are not limited to, data storage, data analysis, control applications (e.g., applications that can generate and deliver control instructions to industrial devices 1008 and 1010 based on analysis of real-time system data or other factors), visualization applications such as the cloud-based operator interface system described herein, reporting applications, Enterprise Resource Planning (ERP) applications, notification services, or other such applications. Cloud platform 1002 may also include one or more object models to facilitate data ingestion and processing in the cloud. If cloud platform 1002 is a web-based cloud, cloud agent devices 1006 at the respective industrial facilities 1004 may interact with cloud services 1012 directly or via the Internet. In an example configuration, the industrial devices 1008 and 1010 connect to the on-premise cloud agent devices 1006 through a physical or wireless local area network or radio link. In another example configuration, the industrial devices 1008 and 1010 may access the cloud platform 1002 directly using integrated cloud agents.

Ingestion of industrial device data in the cloud platform 1002 through the use of cloud agent devices 1006 can offer a number of advantages particular to industrial automation. For one, cloud-based storage offered by the cloud platform 1002 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. Cloud agent devices 1006 can be configured to automatically detect and communicate with the cloud platform 1002 upon installation at any facility, simplifying integration with existing cloud-based data storage, analysis, or reporting applications used by the enterprise. In another example application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). Moreover, cloud based control applications can perform remote decision-making for a controlled industrial system based on data collected in the cloud from the industrial system, and issue control commands to the system via the cloud agent. These industrial cloud-computing applications are only intended to be exemplary, and the systems and methods described herein are not limited to these particular applications. The cloud platform 1002 can allow software vendors to provide software as a service, removing the burden of software maintenance, upgrading, and backup from their customers.

An example cloud-based storage, reporting, or analytics system can leverage historical and/or real-time data collected into cloud storage from on-premise industrial devices. The cloud agent architecture depicted in FIG. 10 can be used to push industrial system data to the cloud platform. According to this cloud agent architecture, the industrial system data is collected by the on-premise cloud agent devices 1006, packaged into data packets, and pushed to the cloud platform for storage and/or additional processing. Example cloud-based systems can provide remote collection and monitoring services in connection with alarm and event notification for critical industrial assets, historical data collection, remote system access, system optimization, remote closed-loop control, and other such applications.

Figure 11:
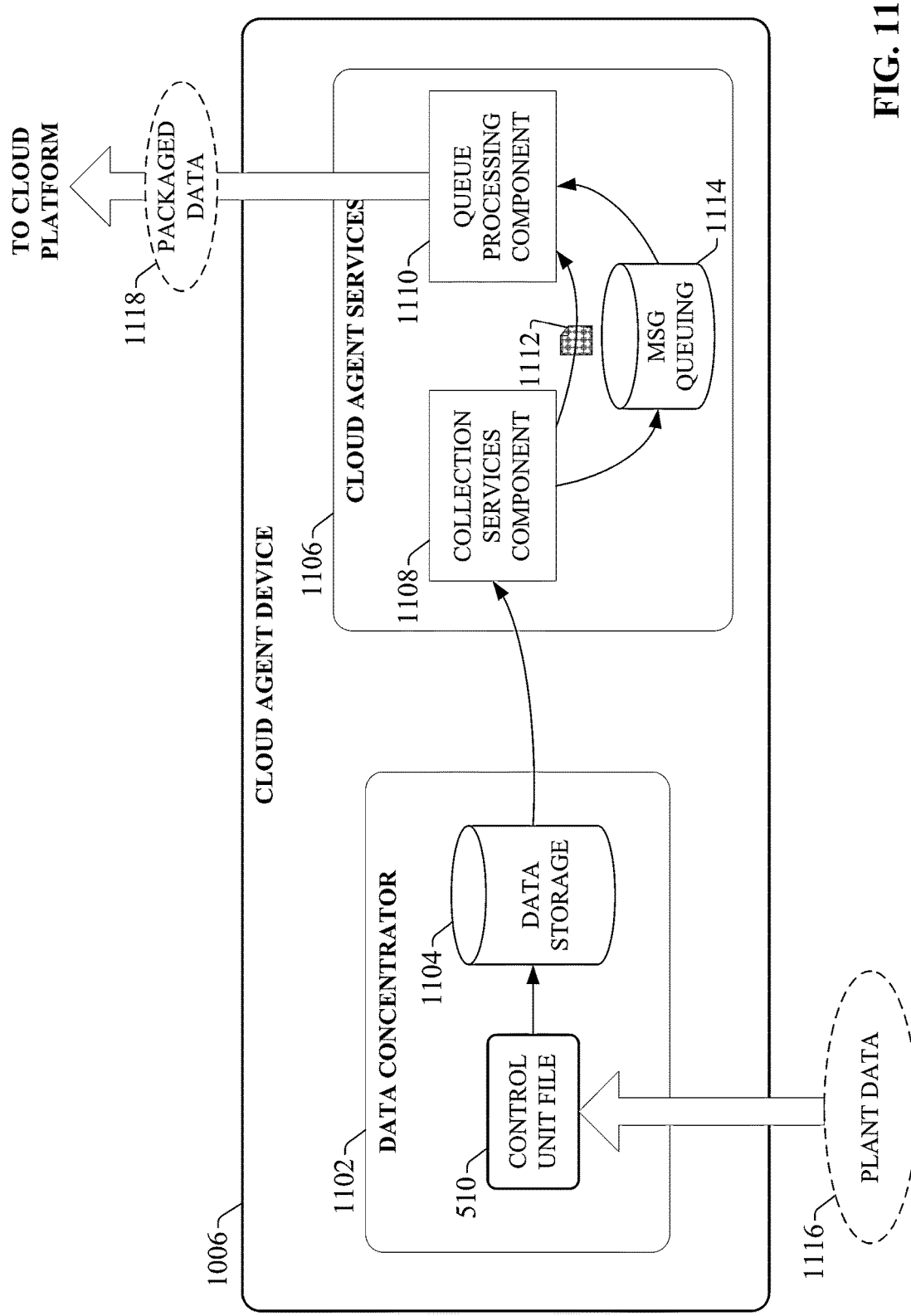
FIG. 11 is a diagram illustrating components of an example cloud agent device that can be used to push industrial data to a cloud platform for storage or analysis.

FIG. 11 is a diagram illustrating components of an example cloud agent device 1006 that can be used to push industrial data to a cloud platform for storage or analysis. In this example implementation, a data concentrator 1102 collects plant data 1116 from one or more industrial assets (e.g., data generated by one or more industrial controllers, such as industrial devices 1008 or 1010) at a plant facility. These industrial assets can include industrial controllers that monitor and control industrial I/O devices, data servers and historians, motor drives, remote I/O interfaces that remotely interface groups of I/O devices to one or more of the industrial controllers, boilers or other industrial machines, or other such assets. For example, data concentrator 1102 can monitor one or more controller tags defined in a tag archive and store data in local data storage 1104 (e.g., a local structured query language, or SQL, server). The collected data can include historical data (e.g., alarm history, status history, trend data, etc.), live data values read from the industrial assets, alarm data generated by the industrial assets, or other types of data. To facilitate collection of the plant data from one or more industrial controllers, the data concentrator 1102 can include a control unit file 510 generated by the configuration management interface system 402 as described in previous examples.

Cloud agent device 1006 can execute on any suitable hardware platform (e.g., a server, a LINUX box, etc.), and acts as a generic gateway that collects data items from the various industrial assets on the plant network and packages the collected data according to a generic, uniform data packaging schema used to move the on-premise data to a cloud platform 1002. Cloud agent device 1006 provides a software mechanism to dynamically link on-premise-to-cloud gateways, and provides an expandable data type schema that allows new data types to be added without the need to redeploy the monitoring system to the cloud.

During data collection, the cloud agent device 1006 can intelligently sort and organize the data based on defined criteria, including but not limited to time of occurrence and/or user-defined priorities. Cloud agent services 1106 can periodically collect and transmit serialized and compressed data into the cloud domain using standard web services over HTTPS/SSL.

On-premise data collection is enabled by a collection of cloud agent services 1106 that function as a virtual support engineer for processing data. Data concentrator 1102 and cloud agent services 1106 respectively implement two main functions associated with data collection—data concentration using a control unit file 510 and associated data storage 1104 (e.g., an SQL server), and cloud data enablement using cloud agent services 1106 executed by cloud agent device 1006. As noted above, plant data 1116 is collected by the data concentrator 1102 at the plant facility. The data concentrator 1102 can use control unit file 510 to access selected data tags in one or more industrial controllers, retrieve the data from the data tags, and move the retrieved data to local data storage 1104 on cloud agent device 1006.

Collection services component 1108 of cloud agent device 1106 implements collection services that collect device data from the data concentrator's associated data storage 1104 (e.g., via an SQL query). For example, to obtain data from data concentrator 1102, collection services component 1108 may periodically run a data extraction query (e.g., an SQL query) to extract data from data storage 1104 associated with data concentrator 1102. Collection services component 1108 can then compress the data and store the data in a compressed data file 1112. Queue processing services executed by queue processing component 1110 can then read the compressed data file 1112 and reference a message queuing database 1114, which maintains and manage customer-specific data collection configuration information, as well as information relating to the customer's subscription to the cloud platform and associated cloud services. Based on configuration information in the message queuing database 1114, queue processing component 1110 packages the compressed data file 1112 into a data packet and pushes the data packet to the cloud platform as packaged data 1118. In some embodiments, the cloud agent device 1006 can support injecting data packets as torrential data. The data packet sent to the cloud conveys parameters and data (compressed and serialized) used by the cloud-side services to reconstruct the domain data structure in the cloud using auxiliary tenant-level manifests.

Message queuing database 1114 can include site-specific information identifying the data items to be collected (e.g., data tag identifiers), user-defined processing priorities for the data tags, firewall settings that allow cloud agent device 1006 to communicate with the cloud platform through a plant firewall, and other such configuration information. Configuration information in message queuing database 1114 instructs cloud agent device 1006 how to communicate with the identified data tags and with the remote data collection services on the cloud platform.

In addition to collection and migration of data, cloud agent device 1006 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, cloud agent device 100 may be configured to compress the collected data using any suitable data compression algorithm prior to migrating the data to the cloud platform. This can include detection and deletion of redundant data bits, truncation of precision bits, or other suitable compression operations. In another example, cloud agent device 1006 may be configured to aggregate data by combining related data from multiple sources. For example, data from multiple sensors measuring related aspects of an automation system can be identified and aggregated into a single cloud upload packet by cloud agent device 1006. Cloud agent device 1006 may also encrypt sensitive data prior to upload to the cloud. In yet another example, cloud agent device 1006 may filter the data according to any specified filtering criterion (e.g., filtering criteria defined in a filtering profile stored on the cloud agent). For example, defined filtering criteria may specify that pressure values exceeding a defined setpoint are to be filtered out prior to uploading the pressure values to the cloud.

In some embodiments, cloud agent device 1006 may also transform a specified subset of the industrial data from a first format to a second format in accordance with a requirement of a cloud-based analysis application. For example, a cloud-based reporting application may require measured values in ASCII format. Accordingly, cloud agent device 1006 can convert a selected subset of the gathered data from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side.

Cloud agent device 1006 may also associate metadata with selected subsets of the data prior to migration to the cloud, thereby contextualizing the data within the industrial environment. For example, cloud agent device 1006 can tag selected subsets of the data with a time indicator specifying a time at which the data was generated, a quality indicator, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In this way, cloud agent device 1006 can perform layered processing of the collected data to generate meta-level knowledge that can subsequently be leveraged by cloud-based analysis tools to facilitate enhanced analysis of the data in view of a larger plant context.

To ensure secure outbound traffic to the cloud, one or more embodiments of cloud agent device 1006 can support HTTPS/SSL, certificate authority enabled transmission, and/or unique identity using MAC addresses. Cloud agent device 1006 can also support store-and-forward capability to ensure data is not lost if the agent becomes disconnected from the cloud.

Figure 12:
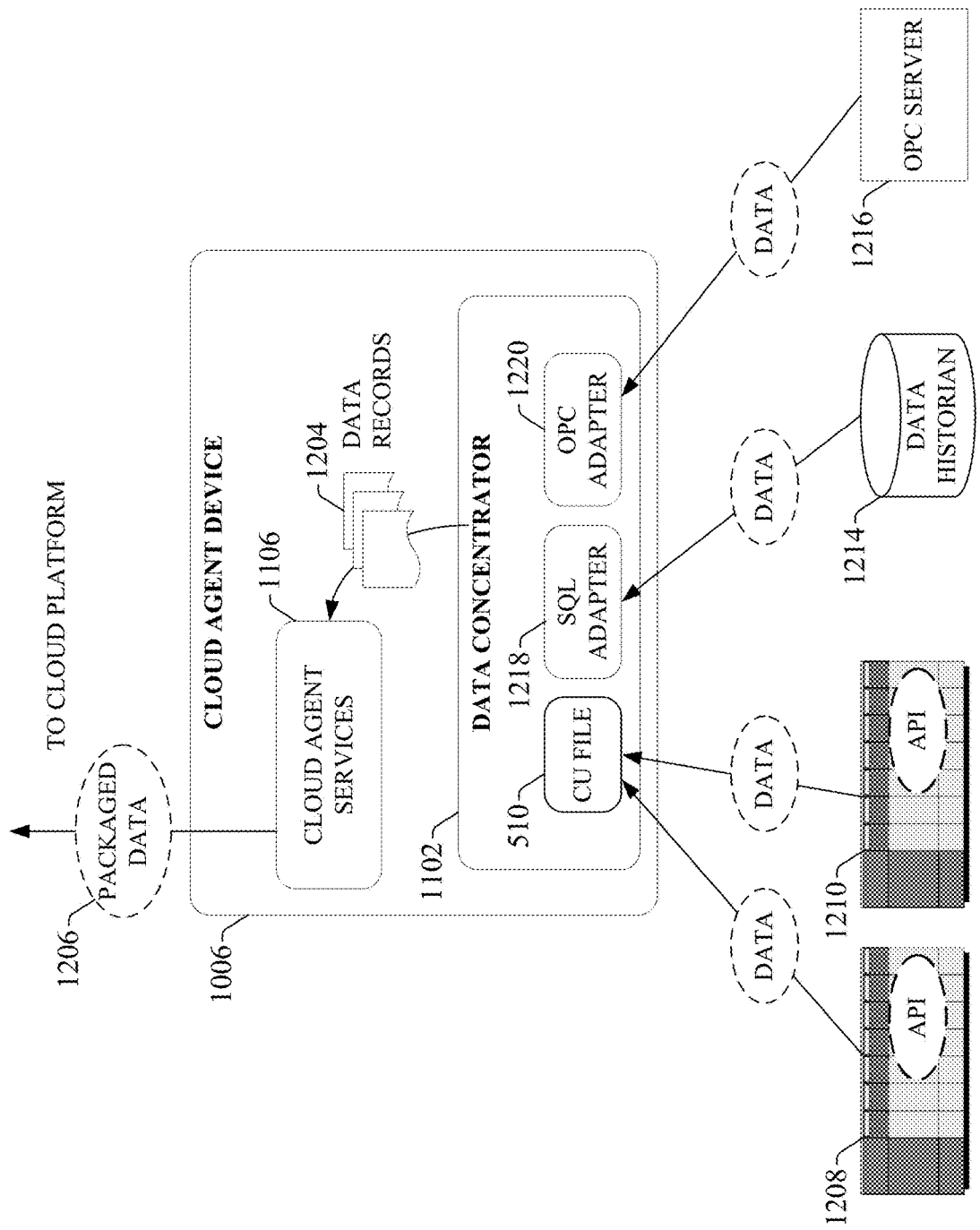
FIG. 12 is a diagram illustrating a cloud agent device comprising a data concentrator that includes multiple different communication adaptors.

In another example configuration, the control unit file 510 can serve as one of multiple communication adapters implemented by the data concentrator 1102, allowing the cloud agent device 1006 to collect data from multiple different data platforms for injection to the cloud platform. FIG. 12 is a diagram illustrating a cloud agent device 1006 having a data concentrator 1102 that includes multiple different communication adaptors. In this example, data concentrator 1102 comprises a control unit file 510 configured to act as a communication channel to two industrial controllers 1208 and 1210. The data concentrator 1102 retrieves data from selected data tags contained in the controllers 1208 and 1210 for packaging and delivery to the cloud platform as packaged data 1206. Additionally, the data concentrator 1102 includes an SQL adaptor 1218 configured to retrieve archived data from a data historian 1214, and an OPC adaptor configured to retrieve data from an OPC server 1216. The data concentrator 1102 provides the data collected from these various data sources to the cloud agent services 1106 as data records 1204, which are then processed by cloud agent services 1106 as discussed above and delivered to the cloud platform.

Figure 13:
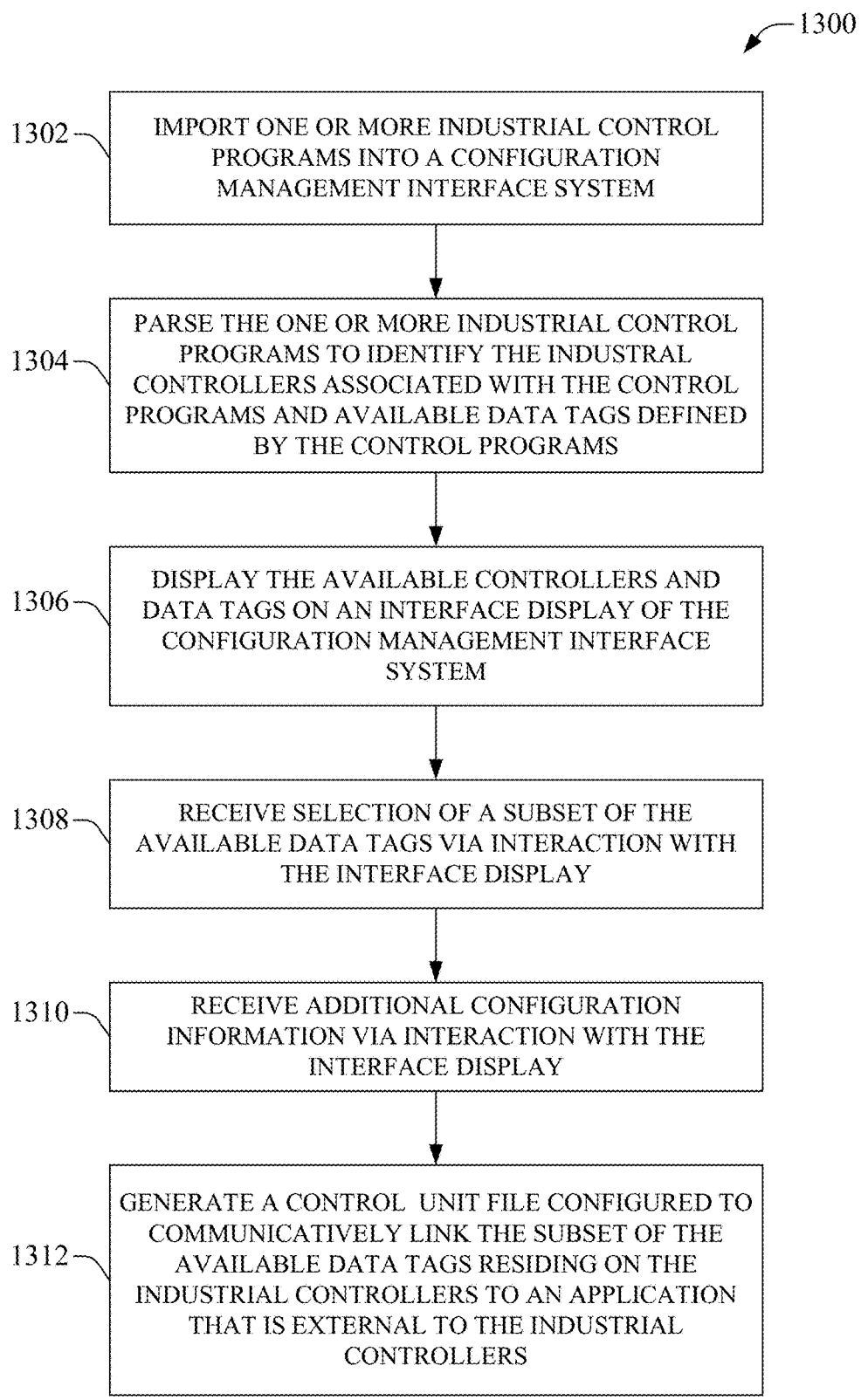
FIG. 13 is a flowchart of an example methodology for generating a control unit file that can act as a communication channel between data tags of one or more industrial controllers and an external or third-party application.
Figure 14:
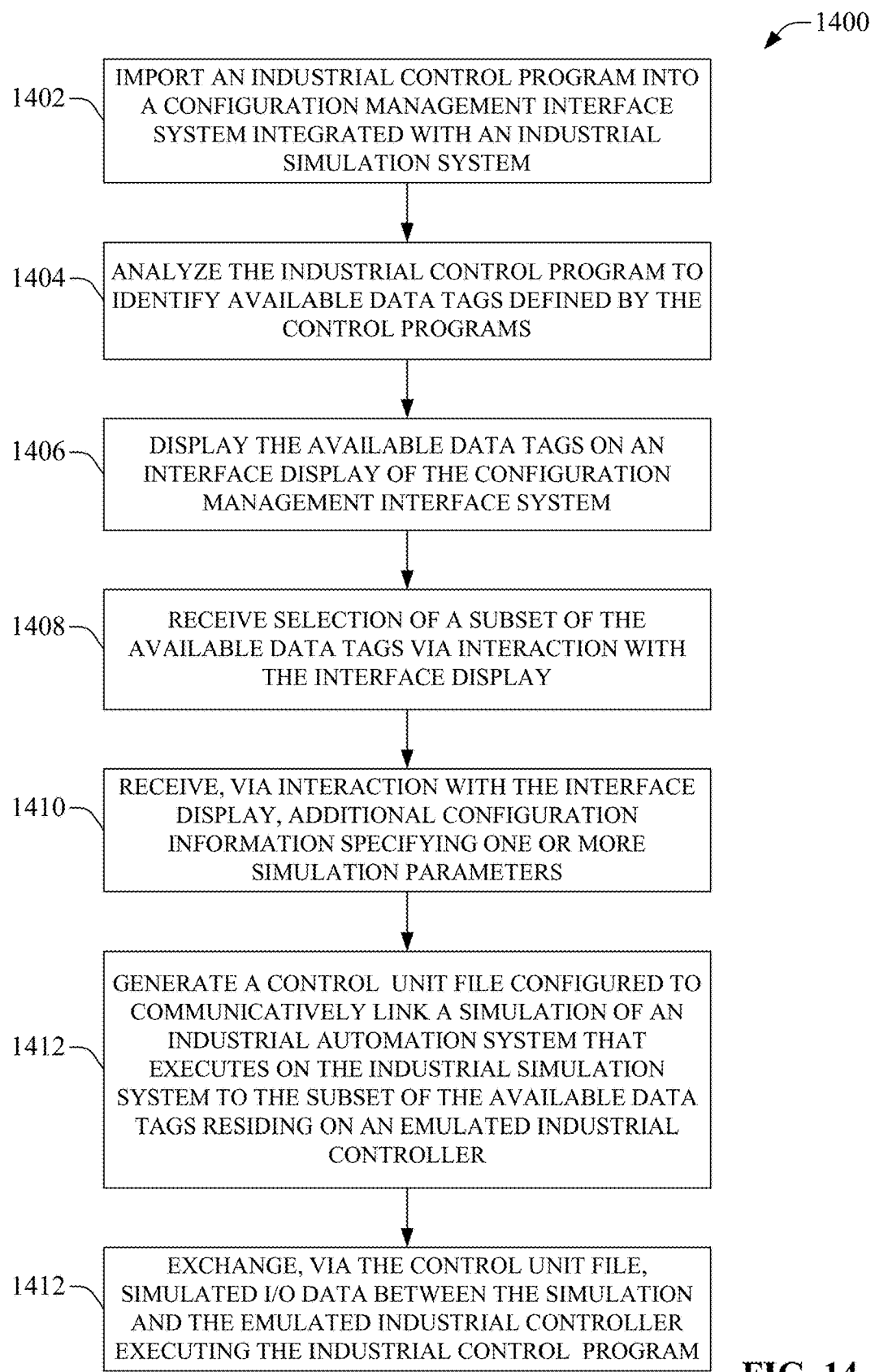
FIG. 14 is a flowchart of an example methodology for generating a control unit file for exchange of data between an emulated industrial controller and a simulation of an industrial automation system.

FIGS. 13-14 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for generating a control unit file that can act as a communication channel between data tags of one or more industrial controllers and an external or third-party application. Initially, at 1302, one or more industrial control programs are imported into a configuration management interface system. The industrial control programs can comprise programs to be downloaded to and executed on respective one or more industrial controllers, and may be programmed using any suitable control programming protocol, including but not limited to ladder logic, sequential function charts, function block diagrams, structured text, or other such programming structure.

At 1304, the one or more industrial control programs are parsed or otherwise analyzed by the configuration management interface system to identify the industrial controllers associated with the control programs, as well as the available data tags defined by the control programs. For example, the configuration management interface system may examine controller configuration information defined by the control programs to identify information about the controllers on which each control program will execute (e.g., the models of the controllers, firmware revisions installed on the controllers, communication or network settings defined for the controllers, etc.). The configuration management interface system can also identify the date tags defined and/or referenced within the control programs themselves, and retrieve these data tags as available data items that can be selectively exposed to the external or third-party application.

At 1306, the available controllers and data tags identified at step 1304 are displayed on an interface display of the configuration management interface system. In one or more embodiments, the available data tags may be presented as a list of tags classified according to the controller in which each data tag was found. Each entry in the list may include, for example, a name and description of the data tag, a data type for the data tag (e.g., real value, Boolean value, string, etc.), an indication of whether the data tag is an input or an output relative to the industrial controller, or other such information.

At 1308, the configuration management interface system receives selection of a subset of the available data tags via interaction with the interface display. The selected data tags will be made available to the external or third-party application. At 1310, additional configuration information is received via interaction with the interface display. The additional configuration information may comprise, for example, information about the external or third-party application, such as a type of the application (e.g., a control system simulation, a product lifecycle management application, a visualization application, a data collection application, a visualization application, etc.), a platform on which the application will be executing (e.g., an operating system, a hardware platform, etc.), or other such information.

At 1312, a control unit file is generated by the configuration management interface system based on the information received at steps 1302, 1308, and 1310, where the control unit file is configured to communicatively link the subset of available data tags selected at step 1308 and residing on the one or more industrial controllers to the external or third-party application. In one or more embodiments, generation of the control unit file may include creation of a model description file that identifies the selected input and output data tags to the external application and a control description file that defines information used by the control unit file to access the selected data tags on the industrial controllers. The resulting control unit file can be used to exchange data with either hardware controllers or emulated industrial controllers that emulate execution of the industrial control programs on one or more virtual or emulated industrial controllers.

FIG. 14 illustrates an example methodology 1400 for generating a control unit file for exchange of data between an emulated industrial controller and a simulation of an industrial automation system. Initially, at 1402, an industrial control program is imported into a configuration management interface system that is integrated with an industrial simulation system. The industrial simulation system can be configured to execute a simulation model of an actual industrial automation system for the purposes of system and program validation. The industrial control program can comprise a program that is to be downloaded and executed on the hardware controller that is to control the actual automation system.

At 1404, the industrial control program is analyzed by the configuration management interface system to identify the available data tags defined by the control program. At 1406, the available data tags identified at step 1404 are displayed on an interface display of the configuration management interface program. At 1408, selection of a subset of the available data tags are received via interaction with the interface display. The selected tags will be exposed to the simulation of the industrial automation system for exchange of simulation data. At 1410, additional configuration information is received via interaction with the interface display. This additional configuration information can comprise, for example, a synchronization period defining a frequency with which data exchanged between the simulation I/O and the selected data tags of the control program will be synchronized or updated, a type of the simulation, or other such information.

At 1412, a control unit file is generated based on the information provided at steps 1402, 1408, and 1410. The control unit file is configured to communicatively link selected simulation I/O of the simulation with the one or more of the data tags of the control program selected at step 1408. At 1412, simulated I/O data is exchanged, using the control unit file, between the simulation of the industrial automation system and an emulated industrial controller that executes the control program within the industrial simulation system. For example, a developer controlling the simulation can selectively link simulated I/O of the automation system simulation (which may correspond to modeled input and output devices that will communicate with the actual controller I/O when the system is deployed on the plant floor) with emulated I/O points of the emulated controller executing the control program within the simulation system. In this way, the control unit file provides a communication bridge between the emulated controller and the simulated automation system to simulate I/O data exchange therebetween. This configuration allows the actual control program that will be downloaded to the hardware controller—rather than a simulated control program that is not compatible with the hardware controller—to be verified against a simulation model of the controlled industrial system.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 15:
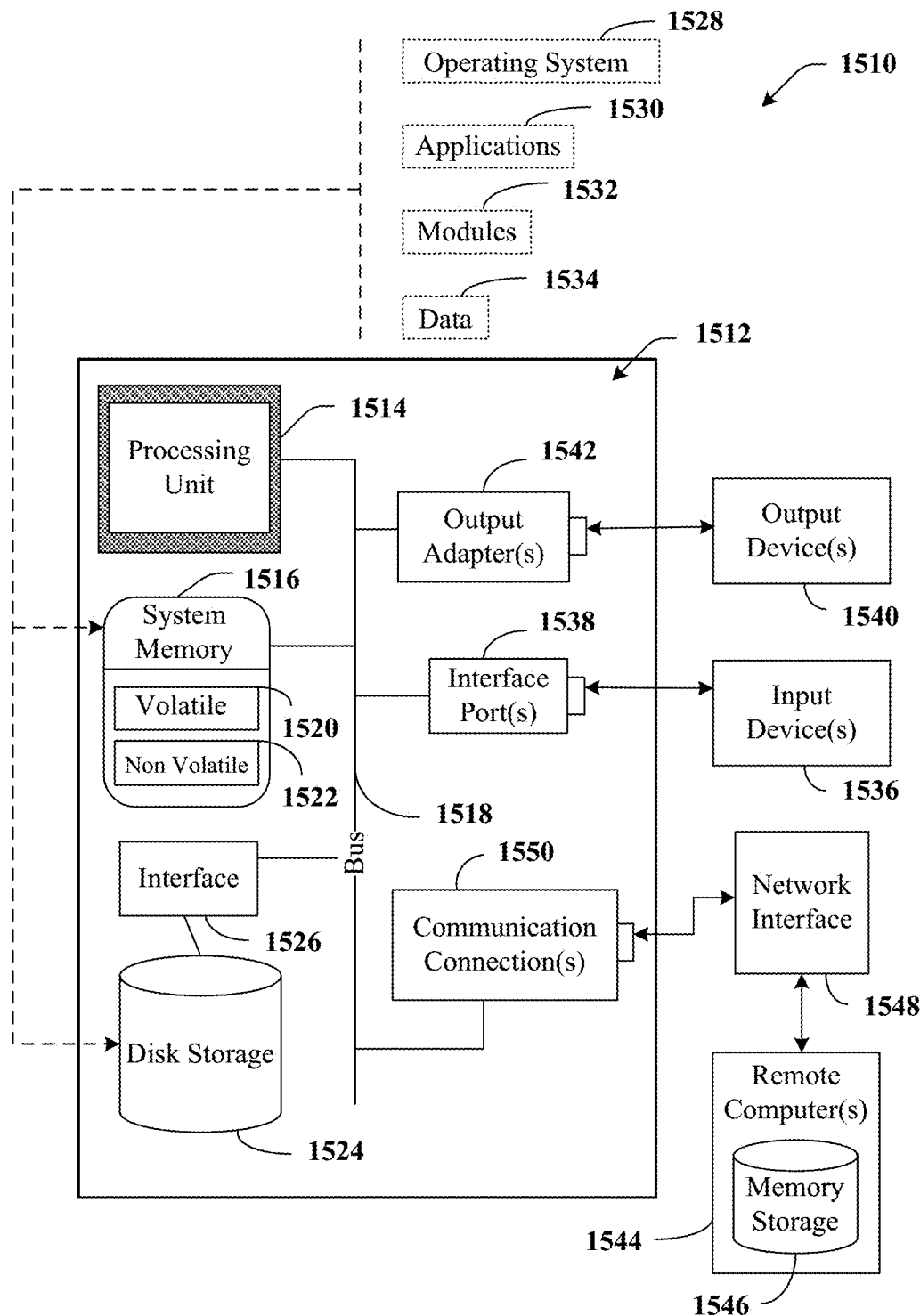
FIG. 15 is an example computing environment.
Figure 16:
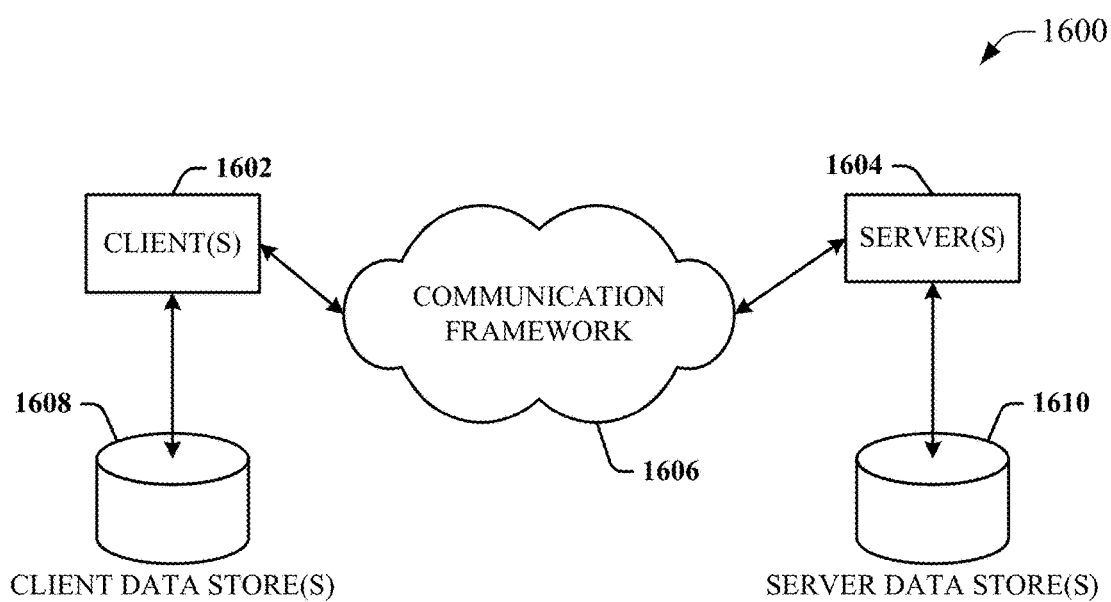
FIG. 16 is an example networking environment.

In order to provide a context for the various aspects of the disclosed subject matter, FIGS. 15 and 16 as well as the following discussion are intended to provide a brief, general description of a suitable environment in which the various aspects of the disclosed subject matter may be implemented.

With reference to FIG. 15, an example environment 1510 for implementing various aspects of the aforementioned subject matter includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Multi-core microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable PROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchronous Link DRAM (SLDRAM), and direct Rambus RAM (DRRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer 1512. System applications 1530 take advantage of the management of resources by operating system 1528 through program modules 1532 and program data 1534 stored either in system memory 1516 or on disk storage 1524. It is to be appreciated that one or more embodiments of the subject disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s)

1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device(s) 1540. Output adapters 1542 are provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection(s) 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the system bus 1518. While communication connection(s) 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

FIG. 16 is a schematic block diagram of a sample computing environment 1600 with which the disclosed subject matter can interact. The sample computing environment 1600 includes one or more client(s) 1602. The client(s) 1602 can be hardware and/or software (e.g., threads, processes, computing devices). The sample computing environment 1600 also includes one or more server(s) 1604. The server(s) 1604 can also be hardware and/or software (e.g., threads, processes, computing devices). The servers 1604 can house threads to perform transformations by employing one or more embodiments as described herein, for example. One possible communication between a client 1602 and servers 1604 can be in the form of a data packet adapted to be transmitted between two or more computer processes. The sample computing environment 1600 includes a communication framework 1606 that can be employed to facilitate communications between the client(s) 1402 and the server(s) 1604. The client(s) 1602 are operably connected to one or more client data store(s) 1608 that can be employed to store information local to the client(s) 1602. Similarly, the server(s) 1604 are operably connected to one or more server data store(s) 1610 that can be employed to store information local to the servers 1604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:
1. A system, comprising:
 a memory that stores executable components; and
 a processor, operatively coupled to the memory, that executes the computer-executable components, the executable components comprising:
  a control program import component that imports one or more industrial control programs and identifies a set of available data items defined by the one or more industrial control programs;

an interface component that renders the set of available data items on an interface display and receives, via interaction with the interface display, selection input selecting a subset of the available data items and configuration input defining a synchronization period specifying a frequency of data updates between one or more emulated industrial controllers and a simulation application that executes a simulation of an industrial control system, wherein the one or more emulated industrial controllers emulate, within a simulation system that executes the simulation application, operating platforms of respective hardware industrial controllers that are separate from the one or more emulated industrial controllers; and a control unit generation component that generates, based on the subset of the available data items, the configuration input, and controller configuration information read from the one or more industrial control programs, a control unit file that establishes exchange of simulated I/O data between the subset of the available data items within the one or more emulated industrial controllers and respective I/O of the simulation application, wherein the control program import component, the interface component, and the control unit generation component are components of the simulation system, the control unit generation component generates the control unit file to synchronize the simulated I/O data between the one or more emulated industrial controllers and the simulation application at the frequency defined by the synchronization period, the control unit file comprises a model description file that is readable by the simulation application and that identifies the subset of the available data items to the simulation application, and a control description file that defines, for a data item of the subset of the available data items, a communication path to an emulated industrial controller, of the one or more emulated industrial controllers, on which the data item resides, and the control unit file is configured to serve as a communication interface between the simulation application and at least one of the hardware industrial controllers that executes an industrial control program of the one or more industrial control programs.

2. The system of claim 1, wherein the control unit generation component generates, as part of the control unit file and based on the controller configuration information, a control assembly that manages data exchange between the control unit file and the subset of the available data items via one or more application programming interfaces that respectively execute on the one or more emulated industrial controllers.

3. The system of claim 2, wherein the control assembly controls execution of the one or more industrial control programs executing on the one or more emulated industrial controllers in accordance with commands generated by the simulation application.

4. The system of claim 2, wherein the control unit generation component reads, from the one or more emulated industrial control programs, controller configuration information identifying the one or more application programming interfaces that respectively execute on the one or more emulated industrial controllers, and generates the control description file to include the controller configuration information.

5. The system of claim 1, wherein the control unit file establishes data exchange between the subset of the available data items within the one or more emulated industrial controllers and at least one of a product life cycle management application, a data collection application, a visualization application that renders values of at least one data item of the subset of the available data items on a graphical interface, an analytics application that performs a data analysis on at least one data item of the subset of the available data items, or a cloud gateway application that retrieves data values associated with the subset of the available data items and sends the data values to a cloud platform for collection and analysis.

6. The system of claim 1, wherein, in response to commands generated by the simulation application and via interaction with an application programming interface that executes on the emulated industrial controller, the control unit file at least one of reads data from or writes data to data items, of the subset of the available data items, defined on the one or more emulated industrial controllers.

7. The system of claim 1, wherein the control unit file generates a monitoring window that displays data values for the subset of the available data items during data exchange between the one or more emulated industrial controllers and the simulation application.

8. The system of claim 1, wherein the control unit file includes a copy of the one or more industrial control programs.

9. A method, comprising:
    importing, by a system comprising a processor, one or more industrial control programs;
    analyzing, by the system, the one or more industrial control programs to identify available data tags and controller configuration information defined by the one or more industrial control programs;
    displaying, by the system, the available data tags on a tag selection display;
    receiving, by the system via interaction with the tag selection display, selection input that selects a subset of the available data tags;
    receiving, by the system via interaction with a configuration display, configuration input specifying a synchronization period that defines a frequency of data updates between one or more emulated industrial controllers and a simulation application that executes a simulation of an industrial control system, wherein the one or more emulated industrial controllers emulate, on a computing device that executes the simulation application, operating platforms of respective hardware industrial controllers that are separate from the computing device;
    receiving, by the system, information identifying a simulation application that is to communicate with the one or more emulated industrial controllers respectively executing the one or more industrial control programs; and
    generating, by the system, a control unit file based on the subset of the available data tags and the controller configuration information,
    wherein
    the control unit file is configured to establish exchange of data between data points of the simulation application and the subset of the available data tags on the one or more emulated industrial controllers, and to synchronize simulated I/O data between the one or more emulated industrial controllers and the simulation application at the frequency defined by the synchronization period, the generating comprises generating, as part of the control unit file, a model description file that identifies the subset of the available data tags to the simulation application, and a control description file that defines, for a data tag of the subset of the available data tags, a communication path to one of the one or more emulated industrial controllers on which the data tag resides, and the control unit file is configured to serve as a communication interface between the simulation application and at least one of the hardware industrial controllers that executes an industrial control program of the one or more industrial control programs.

10. The method of claim 9, wherein the generating comprises generating, as part of the control unit file, a control assembly that controls data communication between the control unit file and the subset of the available data tags via one or more application programming interfaces installed on the one or more emulated industrial controllers.

11. The method of claim 9, further comprising exchanging the data between the simulation application and the subset of the available data tags residing on the one or more emulated industrial controllers using the control unit file.

12. The method of claim 9, wherein the generating further comprises generating the control unit file to include a copy of the one or more industrial control programs.

13. The method of claim 9, wherein the control unit file is further configured to establish data exchange between the subset of the available data tags on the one or more emulated industrial controllers and at least one of a product life cycle management application, a data collection application, a visualization application that renders values of at least one data tag of the subset of the available data tags on a graphical interface, an analytics application that performs a data analysis on at least one data value from the subset of the available data tags, or a cloud gateway application that retrieves data values associated with the subset of the available data tags and sends the data values to a cloud platform for collection and analysis.

14. The method of claim 9, wherein the control unit file is configured to, in response to commands generated by the simulation application and via interaction with an application programming interface that executes on the emulated industrial controller, at least one of read data from or write data to data tags, of the subset of the available data tags, defined on the one or more emulated industrial controllers.

15. The method of claim 9, further comprising generating, by the system, a monitoring window that displays data values for the subset of the available data tags during data exchange between the one or more emulated industrial controllers and the simulation application.

16. A non-transitory computer-readable medium having stored thereon instructions that, in response to execution, cause a system comprising a processor to perform operations, the operations comprising:

importing one or more industrial control programs;

identifying available data items and controller configuration information defined by the one or more industrial control programs based on analysis of the one or more industrial control programs;

displaying the available data items on a configuration display;

receiving, via interaction with the configuration display, selection input that selects a subset of the available data items;

receiving, via interaction with a configuration display, configuration input specifying a synchronization period that defines a frequency of data updates between one or more emulated industrial controllers respectively executing the one or more industrial control programs and a simulation application that executes a simulation of an industrial control system, wherein the one or more emulated industrial controllers emulate, on a computing device that executes the simulation, operating platforms of respective hardware industrial controllers that are separate from the computing device;

receiving information identifying a simulation application that is to communicate with the one or more emulated industrial controllers respectively, wherein the simulation application is configured to execute a simulation of an industrial control system; and generating a control unit file based on the subset of the available data items and the controller configuration information, wherein the control unit file is configured to establish data exchange between the subset of the available data items and simulated I/O points of the simulation application, and to synchronize simulated I/O data between the one or more emulated industrial controllers and the simulation application at the frequency defined by the synchronization period, wherein the generating comprises generating, as part of the control unit file, a model description file that identifies the subset of the available data items to the simulation application, and a control description file that defines, for a data item of the subset of the available data items, a communication path to an emulated industrial controller of the one or more emulated industrial controllers on which the data item resides, and the control unit file is configured to serve as a communication interface between the simulation application and at least one of the hardware industrial controllers that executes an industrial control program of the one or more industrial control programs.

17. The non-transitory computer-readable medium of claim 16, wherein the generating comprises generating, as part of the control unit file, a control assembly that controls data communication between the control unit file and the subset of the available data tags via one or more application programming interfaces installed on the one or more emulated industrial controllers.

18. The non-transitory computer-readable medium of claim 16, wherein the operations further comprise exchanging data between the simulation application and the subset of the available data tags residing on the one or more emulated industrial controllers using the control unit file.

19. The non-transitory computer-readable medium of claim 16, wherein the generating further comprises generating the control unit file to include a copy of the one or more industrial control programs.

20. The non-transitory computer-readable medium of claim 16, wherein the control unit file generates monitoring window that displays data values for the subset of the available data items during data exchange between the one or more emulated industrial controllers and the simulation application.

* * * * *